(12) United States Patent
Park et al.

(10) Patent No.: US 10,461,889 B2
(45) Date of Patent: Oct. 29, 2019

(54) INTERFERENCE AWARE TRANSCEIVER DESIGN FOR HETEROGENEOUS NUMEROLOGY SYSTEMS

(71) Applicant: QUALCOMM Incorporated, San Diego, CA (US)

(72) Inventors: Seyong Park, San Diego, CA (US); Hao Xu, Beijing (CN); Wei Zeng, San Diego, CA (US); Jing Jiang, San Diego, CA (US); Joseph Binamira Soriaga, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 15/650,116

(22) Filed: Jul. 14, 2017

(65) Prior Publication Data
US 2018/0048422 A1 Feb. 15, 2018

Related U.S. Application Data

(60) Provisional application No. 62/373,896, filed on Aug. 11, 2016.

(51) Int. Cl.
H04L 1/00 (2006.01)
H04B 1/7073 (2011.01)
(Continued)

(52) U.S. Cl.
CPC ....... H04L 1/0048 (2013.01); H04B 1/70735 (2013.01); H04B 17/345 (2015.01);
(Continued)

(58) Field of Classification Search
None
See application file for complete search history.

(56) References Cited

U.S. PATENT DOCUMENTS 9,137,074 B2  9/2015  Vilaipornsawai et al.
9,247,553 B2  1/2016  Jagger et al.
(Continued)

OTHER PUBLICATIONS

Ericsson: "Mixed Numerology in an OFDM System", 3GPP Draft; R1-165833, 3rd Generation Partnership Project (3GPP), Mobile Competence Centre, 650, Route Des Lucioles; F-06921 Sophia-Anti Polis Cedex, France, vol. RAN WG1. No. Nanjing; May 30, 2016, XP051112002, Retrieved from the Internet: URL:http://www.3gpp.org/ftp/tsg_ran/WG1_RL1/TSGR1 85/Docs/ [retrieved on May 30, 2016], 9 pages.

(Continued)

Primary Examiner — Rebecca E Song
(74) Attorney, Agent, or Firm — Patterson & Sheridan, LLP

(57) ABSTRACT

According to aspects, a BS may determine presence of a narrow GB or lack of a GB to separate a first RB used for DL transmission from the BS to a first UE and a second RB used for DL transmission from the BS to a second UE. In response to the determination, the BS may transmit, to the first UE, interference information associated with the transmission from the BS to the second UE. According to aspects, a BS may determine a presence of a narrow GB or lack of a GB to separate a first RB used for UL transmission from a first UE to the BS and a second RB used for UL transmission from a second UE to the BS. In response to the determination, the BS may transmit to the first UE, interference information associated with the UL transmission from the second UE to the BS.

26 Claims, 18 Drawing Sheets

(51) Int. Cl.
  *H04W 24/10*     (2009.01)
  *H04W 52/24*     (2009.01)
  *H04W 72/08*     (2009.01)
  *H04W 74/00*     (2009.01)
  *H04B 17/345*    (2015.01)
  *H04B 1/707*     (2011.01)
  *H04B 7/26*      (2006.01)
  *H04L 5/00*      (2006.01)

(52) U.S. Cl.
  CPC .............. *H04L 1/00* (2013.01); *H04L 1/0026* (2013.01); *H04W 24/10* (2013.01); *H04W 52/243* (2013.01); *H04W 72/082* (2013.01); *H04W 74/002* (2013.01); *H04B 1/70712* (2013.01); *H04B 1/70718* (2013.01); *H04B 7/26* (2013.01); *H04L 5/0007* (2013.01)

(56) References Cited

U.S. PATENT DOCUMENTS

| | | | |
|---|---|---|---|
| 2011/0019634 A1* | 1/2011 | Fujii | H04W 16/14 370/329 |
| 2011/0228838 A1* | 9/2011 | Yang | H04B 3/23 375/232 |
| 2012/0190392 A1* | 7/2012 | Aminaka | H04W 24/02 455/501 |
| 2013/0163529 A1 | 6/2013 | Chen et al. | |
| 2014/0233407 A1* | 8/2014 | Pourahmadi | H04L 5/0007 370/252 |
| 2015/0087352 A1* | 3/2015 | Lim | H04W 72/0453 455/522 |
| 2015/0373598 A1* | 12/2015 | Tsuboi | H04W 16/32 370/331 |
| 2016/0127953 A1 | 5/2016 | McMeekin et al. | |
| 2016/0128072 A1 | 5/2016 | Rajagopal et al. | |
| 2016/0150532 A1 | 5/2016 | Bhushan et al. | |
| 2017/0118055 A1* | 4/2017 | Guey | H04L 1/0005 |
| 2018/0159643 A1* | 6/2018 | Huang | H04B 17/345 |

OTHER PUBLICATIONS

International Search Report and Written Opinion—PCT/US2017/042277—ISA/EPO—dated Oct. 2, 2017.

* cited by examiner

INTERFERENCE AWARE TRANSCEIVER DESIGN FOR HETEROGENEOUS NUMEROLOGY SYSTEMS

CROSS-REFERENCE TO RELATED APPLICATIONS

This application claims benefit of priority from commonly-owned U.S. Provisional Application Ser. No. 62/373,896, filed on Aug. 11, 2016, entitled "INTERFERENCE AWARE TRANSCEIVER DESIGN FOR HETEROGENEOUS NUMEROLOGY SYSTEMS," which is expressly incorporated herein by reference in its entirety.

INTRODUCTION

Aspects of the present disclosure relate to wireless communications systems and, more particularly, to interference aware transceivers for heterogeneous numerology systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access (RA)). NR is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for interference aware transceivers for heterogeneous numerology systems are described herein.

In an aspect, a method for wireless communication is provided. The method may be performed, for example, by a BS. The method generally includes determining presence of a narrow guard band (GB) or lack of a GB to separate a first resource block (RB) used for downlink (DL) transmission from the BS to a first user equipment (UE) and a second RB used for DL transmission from the BS to a second UE and in response to the determination, transmitting, to the first UE, interference information associated with the transmission from the BS to the second UE.

In an aspect, a method for wireless communication is provided. The method may be performed, for example, by a first UE. The method generally includes determining interference information associated with DL transmission from BS to a second UE, wherein a narrow GB or lack of a GB is present to separate a first RB used for DL transmission from the BS to the first UE and a second RB used for DL transmission from the BS to the second UE and taking one or more actions based, at least in part, on the interference information.

In an aspect, a method for wireless communication is provided. The method may be performed, for example, by a BS. The method generally includes determining presence of a narrow guard band (GB) or lack of a GB to separate a first resource block (RB) used for uplink (UL) transmission from a first user equipment (UE) to the BS and a second RB used for UL transmission from a second UE to the BS and in response to the determination, transmitting, to the first UE, interference information associated with the UL transmission from the second UE to the BS.

In an aspect, a method for wireless communication is provided. The method may be performed, for example, by a first UE. The method generally includes receiving interference information associated with an uplink (UL) transmission from a second UE to a base station (BS), wherein a narrow guard band (GB) or lack of a GB is present to separate a first resource block (RB) used for UL transmission from the first UE to the BS and a second RB used for UL transmission from the second UE to the BS and transmitting uplink data to the BS based, at least in part, on the interference information.

In an aspect, an apparatus for wireless communication by a base station (BS) is provided. The apparatus generally includes means for determining presence of a narrow guard band (GB) or lack of a GB to separate a first resource block (RB) used for downlink (DL) transmission from the BS to a first user equipment (UE) and a second RB used for DL transmission from the BS to a second UE, in response to the determination, means for transmitting, to the first UE, interference information associated with the transmission from the BS to the second UE.

In an aspect, an apparatus for wireless communication by a first user equipment (UE) is provided. The apparatus generally includes means for determining interference information associated with downlink (DL) transmission from a base station (BS) to a second UE, wherein a narrow guard band (GB) or lack of a GB is present to separate a first resource block (RB) used for DL transmission from the BS to the first UE and a second RB used for DL transmission from the BS to the second UE and means for taking one or more actions based, at least in part, on the interference information.

In an aspect, an apparatus for wireless communication by a by a base station (BS) is provided. The apparatus generally includes means for determining presence of a narrow guard band (GB) or lack of a GB to separate a first resource block (RB) used for uplink (UL) transmission from a first user equipment (UE) to the BS and a second RB used for UL transmission from a second UE to the BS and in response to the determination, means for transmitting, to the first UE, interference information associated with the UL transmission from the second UE to the BS.

In an aspect, an apparatus for wireless communication by a first user equipment (UE) is provided. The apparatus generally includes means for receiving interference information associated with an uplink (UL) transmission from a second UE to a base station (BS), wherein a narrow guard band (GB) or lack of a GB is present to separate a first resource block (RB) used for UL transmission from the first UE to the BS and a second RB used for UL transmission from the second UE to the BS and means for transmitting uplink data to the BS based, at least in part, on the interference information.

In an aspect, an apparatus for wireless communication by a base station (BS) is provided. The apparatus generally includes at least one processor, a transmitter, and a memory coupled to the at least one processor. The at least one processor is configured to determine presence of a narrow guard band (GB) or lack of a GB to separate a first resource block (RB) used for downlink (DL) transmission from the BS to a first user equipment (UE) and a second RB used for DL transmission from the BS to a second UE and the transmitter configured to transmit, to the first UE, interference information associated with the transmission from the BS to the second UE, in response to the determination.

In an aspect, an apparatus for wireless communication by a first user equipment (UE) is provided. The first UE generally includes at least one processor and a memory coupled to the at least one processor. The at least one processor is configured to determine interference information associated with downlink (DL) transmission from a base station (BS) to a second UE, wherein a narrow guard band (GB) or lack of a GB is present to separate a first resource block (RB) used for DL transmission from the BS to the first UE and a second RB used for DL transmission from the BS to the second UE and take one or more actions based, at least in part, on the interference information.

In an aspect, an apparatus for wireless communication by a base station (BS) is provided. The apparatus generally includes at least one processor, a transmitter, and a memory coupled to the at least one processor. The at least one processor is configured to determine presence of a narrow guard band (GB) or lack of a GB to separate a first resource block (RB) used for uplink (UL) transmission from a first user equipment (UE) to the BS and a second RB used for UL transmission from a second UE to the BS and the transmitter is configured to transmit, to the first UE, interference information associated with the UL transmission from the second UE to the BS, in response to the determination.

In an aspect, an apparatus for wireless communication by a first user equipment (UE) is provided. The apparatus generally includes a receiver configured to receive interference information associated with an uplink (UL) transmission from a second UE to a base station (BS), wherein a narrow guard band (GB) or lack of a GB is present to separate a first resource block (RB) used for UL transmission from the first UE to the BS and a second RB used for UL transmission from the second UE to the BS and a transmitter configured to transmit uplink data to the BS based, at least in part, on the interference information. The apparatus may include at least one processor and a memory coupled to the at least one processor.

In an aspect, a computer readable medium for wireless communication by a base station (BS) is provided. The computer readable medium has instructions stored thereon for determining presence of a narrow guard band (GB) or lack of a GB to separate a first resource block (RB) used for downlink (DL) transmission from the BS to a first user equipment (UE) and a second RB used for DL transmission from the BS to a second UE and in response to the determination, transmitting, to the first UE, interference information associated with the transmission from the BS to the second UE.

In an aspect, a computer readable medium for wireless communication by a first user equipment (UE) is provided. The computer readable medium has instructions stored thereon for determining interference information associated with downlink (DL) transmission from a base station (BS) to a second UE, wherein a narrow guard band (GB) or lack of a GB is present to separate a first resource block (RB) used for DL transmission from the BS to the first UE and a second RB used for DL transmission from the BS to the second UE, and taking one or more actions based, at least in part, on the interference information.

In an aspect, a computer readable medium for wireless communication by a base station (BS) is provided. The computer readable medium has instructions stored thereon for determining presence of a narrow guard band (GB) or lack of a GB to separate a first resource block (RB) used for uplink (UL) transmission from a first user equipment (UE) to the BS and a second RB used for UL transmission from a second UE to the BS and in response to the determination, transmitting, to the first UE, interference information associated with the UL transmission from the second UE to the BS.

In an aspect, a computer readable medium for wireless communication by a first user equipment (UE) is provided. The computer readable medium has instructions stored thereon for receiving interference information associated with an uplink (UL) transmission from a second UE to a base station (BS), wherein a narrow guard band (GB) or lack of a GB is present to separate a first resource block (RB) used for UL transmission from the first UE to the BS and a second RB used for UL transmission from the second UE to the BS and transmitting uplink data to the BS based, at least in part, on the interference information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
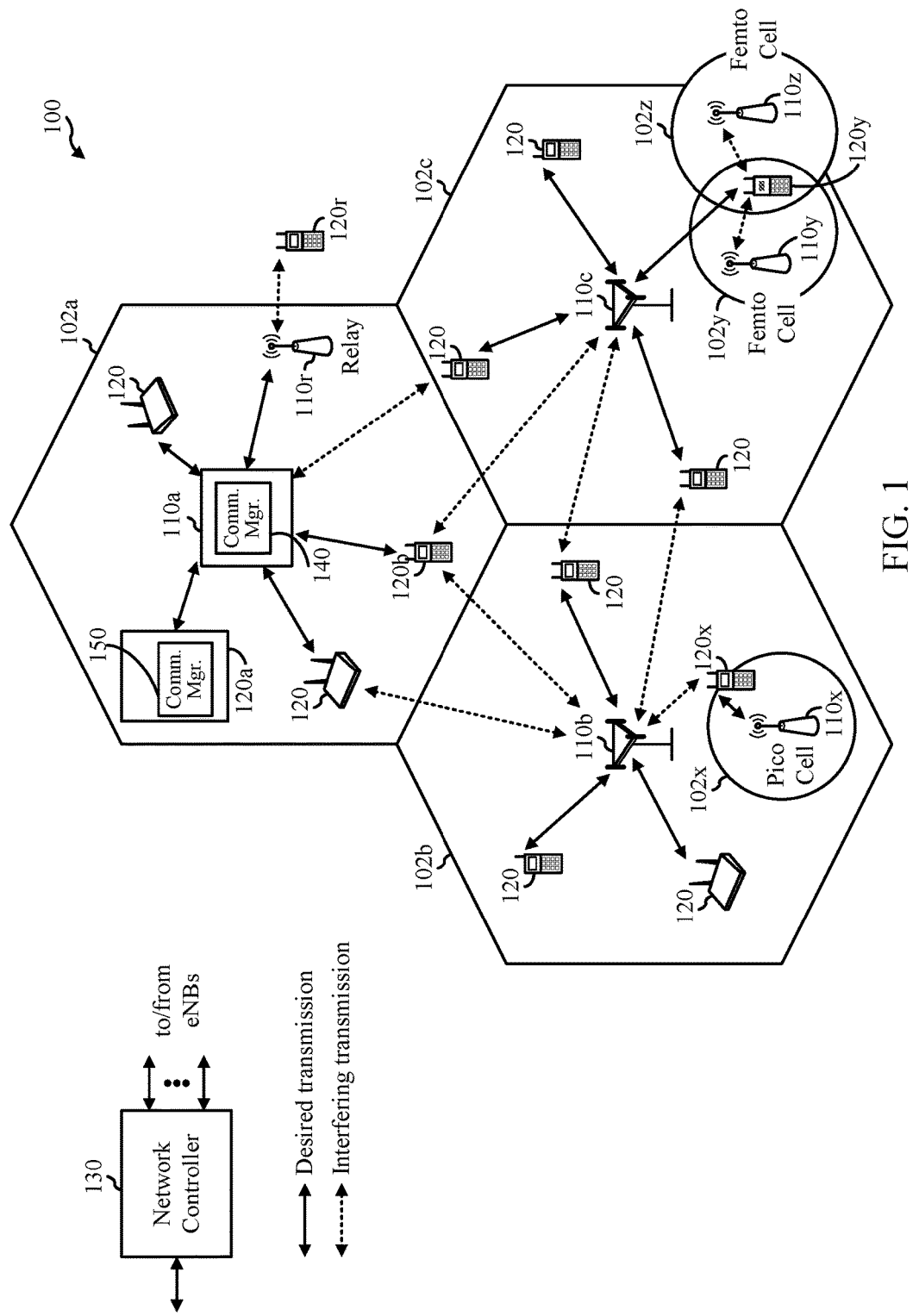
FIG. 1 is a block diagram conceptually illustrating an example telecommunications system, according to aspects of the present disclosure.

Aspects of the present disclosure provide apparatus, methods, processing systems, and computer readable mediums for interference aware transceivers in heterogeneous numerology systems. Heterogeneous numerology systems may refer to wireless communication systems in which UEs may be asynchronous, have different intercarrier spacing and/or have different cyclic prefix lengths.

Due to the heterogeneous numerology, an OFDM waveform transmitted by a BS to a first UE may interfere with an OFDM waveform transmitted by the same BS to a second UE. Guard bands (GB) may be used to separate DL transmissions to UEs within a system; however, GBs may lead to unused (wastage) of spectrum, which is generally a valuable resource.

The use of a narrow GB or even a lack of a guard band between DL transmissions for UEs or UL transmissions from UEs within a system may save spectrum resources. However, DL transmissions for different UEs may interfere with each other without sufficient separation of the DL transmissions. Similarly, UL transmissions from different UEs to a BS may interfere with each other without sufficient separation of the UL transmissions.

Accordingly, aspects of the present disclosure provide techniques for identifying interference and techniques for interference handling in scenarios where no guard band exists between DL transmissions from a BS to at least two UEs in a system and/or a only a narrower guard band than is needed to separate DL transmissions to UEs is present between DL transmissions to at least two UEs in a system.

Additionally, aspects of the present disclosure provide techniques for identifying interference and techniques for interference handling in scenarios where no guard band exists between UL transmissions from at least two UEs in a system to a BS and/or a only a narrower guard band than is needed to separate UL transmissions to the BS is present.

Thus, the aspects described herein facilitate communication in a heterogeneous wireless communication environment. Based at least in part on interference information, transceivers at the UE and BS may account for interference caused by communication without guard bands or with a narrow guard band.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer-readable medium for execution on a processor or computer. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals (SSs). However, in some cases DCells may transmit SSs. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive a measurement configuration from the RAN. The measurement configuration information may indicate ACells or DCells for the UE to measure. The UE may monitor/detect measurement reference signals from the cells based on measurement configuration information. In some cases, the UE may blindly detect MRS. In some cases the UE may detect MRS based on MRS-IDs indicated from the RAN. The UE may report the measurement results.

Example Wireless Communications System

FIG. 1 illustrates an example wireless network 100 in which aspects of the present disclosure may be performed. For example, the wireless network may be a NR or 5G network. The UEs 120 and BSs 110, which may comprise a transmission reception point (TRP), may be configured to perform aspects discussed in more detailed herein for communicating in a wireless communication system having a heterogeneous numerology.

According to aspects, the wireless network 100 may be a heterogeneous numerology system, wherein UEs 120 within the network 100 may be asynchronous, have different inter-carrier spacing, and/or have different cyclic prefix lengths. Aspects of the present disclosure provide interference handling techniques that may advantageously be used by transceivers at the BS 110 and the UE 120 when (1) no guard band (GB) is present between DL transmissions from the BS 110 to at least two UEs 120 and/or (2) a narrow GB is present between DL transmissions from the BS 110 to at least two UEs 120, such that the DL transmissions may interfere with each other. The illustrated and described BSs may comprise a transmission reception point (TRP).

For example a BS 110a may determine presence of a narrow GB or lack of a GB between a first resource (RB) block used for DL transmissions from the BS 110a to a first UE 120a and a second RB used for DL transmissions from the BS 110a to a second UE 120b. In response, the BS 110a may transmit, to the first UE 120a, interference information associated with the DL transmissions to the second UE 120b.

Correspondingly, a first UE 120a may determine interference information associated with DL transmission from the BS 110a to a second UE 120b. As will be described in more detail herein, the first UE 120a may receive the interference information from the BS 110a or may blindly detect the interference information associated with the DL transmission to the second UE 120b. The UE 120a may take one or more actions based, at least in part, on the interference information. For example, the first UE may perform symbol decoding and/or channel estimation based on the interference information.

According to aspects, uplink transmissions by two UEs with different numerologies may be supported. For example, a first UE 120a and a second UE 120b may communicate with a BS 110a. Each of the UEs 120a and 120b may transmit a scheduling request to the BS 110a. The BS 110a may transmit an uplink grant to each of the UEs 120a, 120b. Additionally, the BS 110a may transmit interference information regarding uplink transmissions from UE 120b to UE 120a and may transmit interference information regarding uplink transmissions from UE 120a to UE 120b. UEs 120a, 120*b* may use the interference information, received via a downlink channel, to transmit to the BS 110*a* using an uplink channel. In this manner, asynchronous UEs 120*a*, 120*b* may perform uplink transmissions to reduce interference experienced the BS 110*a*.

According to aspects, a BS and a UE may each include a communication manager module 140 and 150, respectively. The communication manager 140, 150 may take one or more actions for UL or DL transmission based on determined interference information. The communication manager may be a separate entity or may be incorporated within any one or more modules illustrated, for example in FIGS. 4, 17, and 18. As an example, the communication manager may be part of the controller/processor 440, 480, processors 1720, 1820, and/or the transceiver 432, 454, 1710, 1812.

In one example, the communication manager 150 may determine interference information associated with DL transmissions to another UE and/or interference information associated with UL transmissions from another UE to a BS. In response to this interference information, the UE (communication manager 150) may take action to process an UL signal or receive a DL signal from the BS. As an example, the UE may determine a portion of a transmission may be corrupt due to the interference. In response, the UE may use a lower modulation and coding scheme for decoding a DL signal or encoding an UL signal. According to another example, the UE may adjust a noise level for a tone which may experience higher level of interference.

In one example, the communication manager 140 at the BS may determine interference information associated with DL transmissions to another UE and/or interference information associated with UL transmissions from another UE to the BS. In response, the BS (communication manager 140) may take action to process a DL signal to be transmitted to the UE or receive an UL signal from the UE. For example, the BS may determine a portion of a DL transmission to a first UE may be corrupt due to interference. In response, the BS may use a lower modulation and coding scheme to encode a DL signal for the UE.

The BS 110 may be configured to perform the operations 1000 and 1400 and the UE 120 (e.g., UE 120*a*) may be configured to perform the operations 1100 and 1500. Furthermore, the BS 110*a* and the UE 120*a* may be configured to perform other aspects described for interference handling in a heterogeneous numerology wireless communication system, which are described in more detail herein.

The system illustrated in FIG. 1 may be, for example, a long term evolution (LTE) network. The wireless network 100 may include a number of Node Bs (e.g., eNodeBs, eNBs, 5G Node B, etc) 110 and other network entities. A Node B may be a station that communicates with the UEs and may also be referred to as a base station, an access point, or a 5G Node B.

Each Node B 110 may provide communication coverage for a particular geographic area. In 3GPP, the term "cell" can refer to a coverage area of an Node B and/or an Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110*a*, 110*b* and 110*c* may be macro Node Bs for the macro cells 102*a*, 102*b* and 102*c*, respectively. The Node B 110*x* may be a pico Node B for a pico cell 102*x*. The Node Bs 110*y* and 110*z* may be femto Node Bs for the femto cells 102*y* and 102*z*, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG. 1, a relay station 110*r* may communicate with the Node B 110*a* and a UE 120*r* in order to facilitate communication between the Node B 110*a* and the UE 120*r*. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro Node Bs, pico Node Bs, femto Node Bs, relays, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. New radio (NR) may use a different air interface, other than OFDM-based. NR networks may include entities such central units or distributed units.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Figure 2:
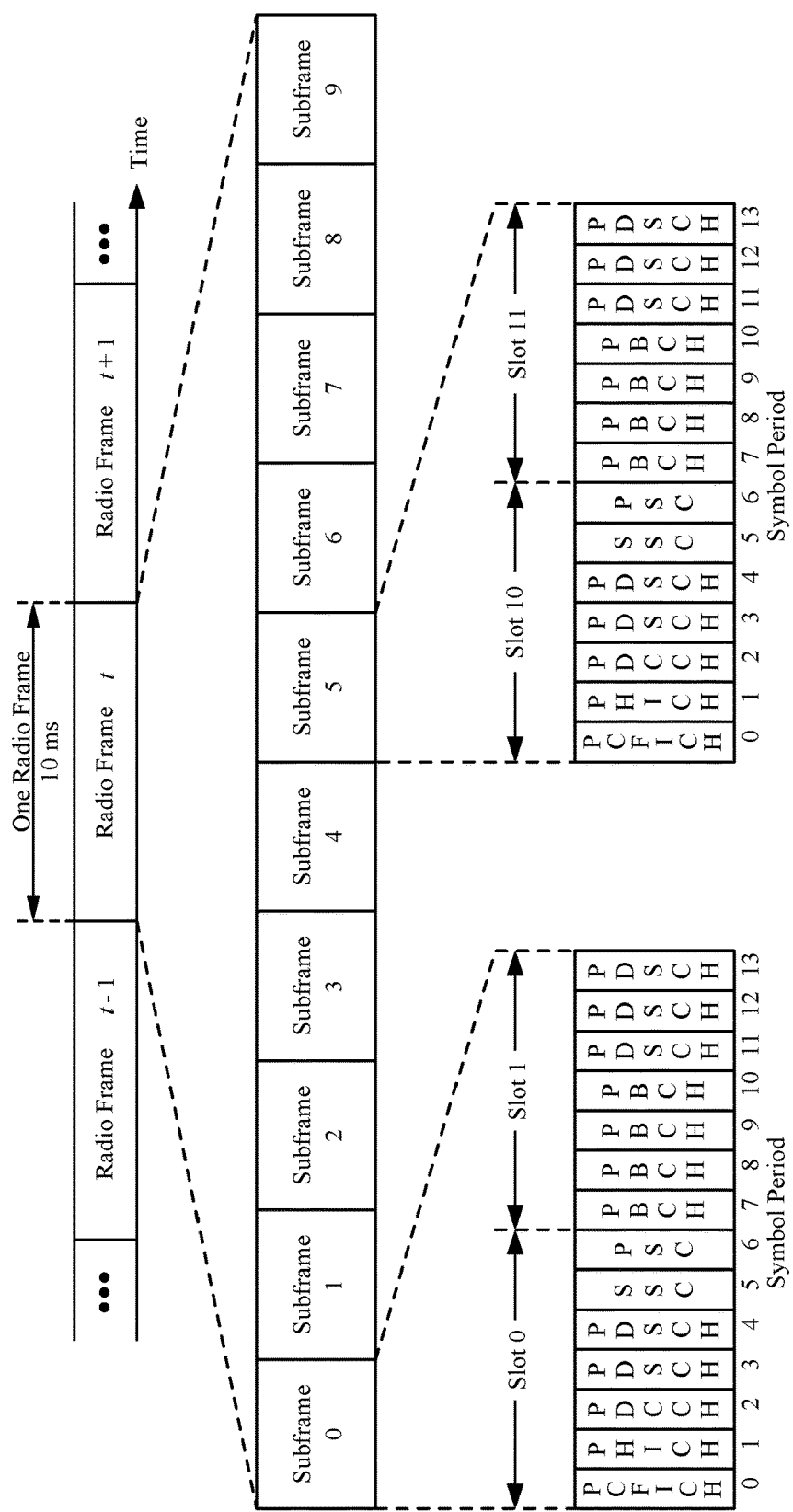
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks (RBs). Each RB may cover N subcarriers (e.g., 12 subcarriers) in one slot (e.g., 0.5 ms).

In LTE, a Node B may send a primary synchronization signal (PSS) and a secondary synchronization signal (SSS) for each cell in the Node B. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The Node B may send a Physical Broadcast Channel (PBCH) in symbol periods 0 to 3 in slot 1 of sub-frame 0. The PBCH may carry certain system information.

The Node B may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The Node B may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The Node B may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The Node B may send the PSS, SSS and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

Figure 3:
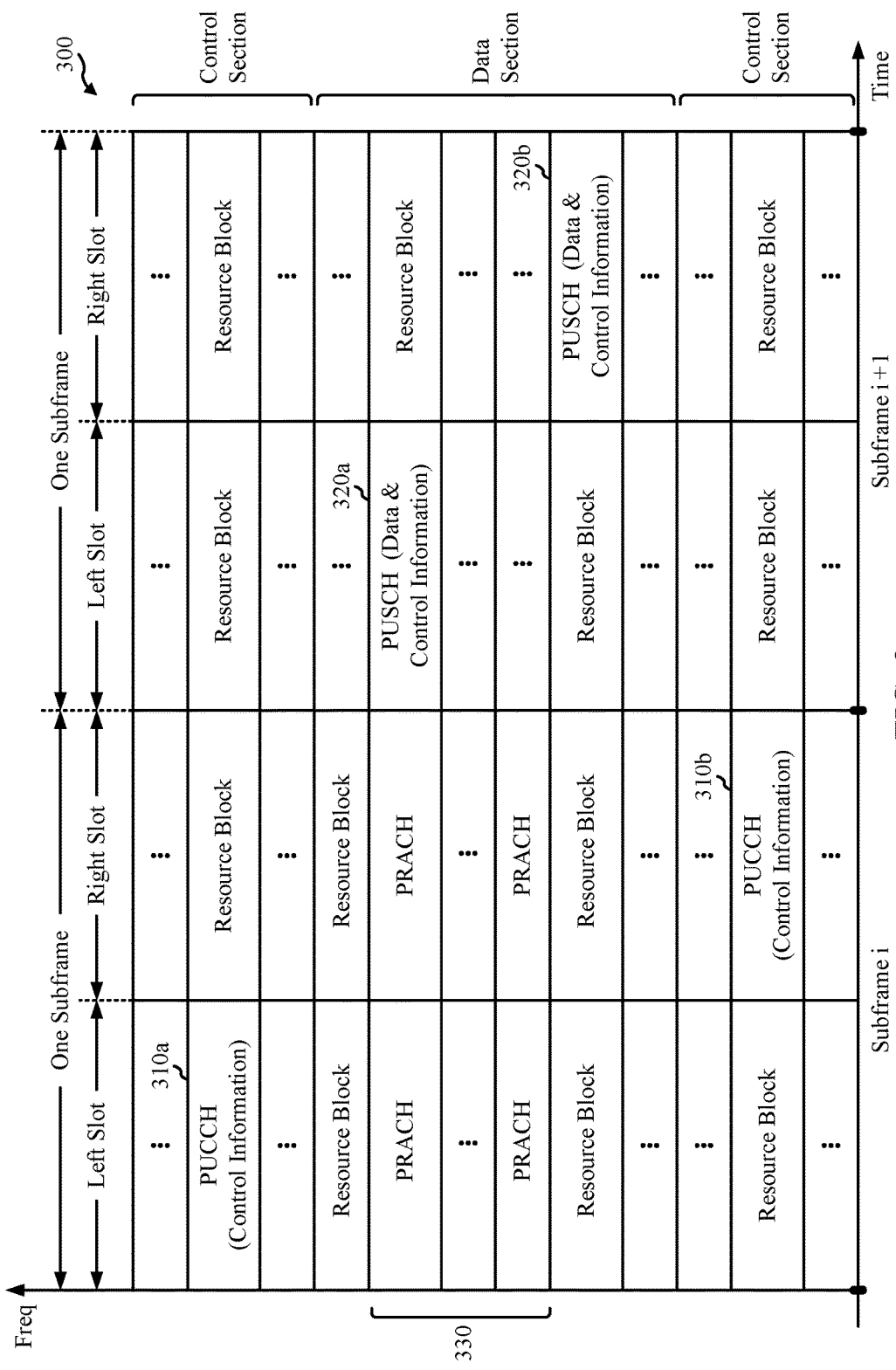
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a Node B. The UE may also be assigned resource blocks 320a, 320b in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
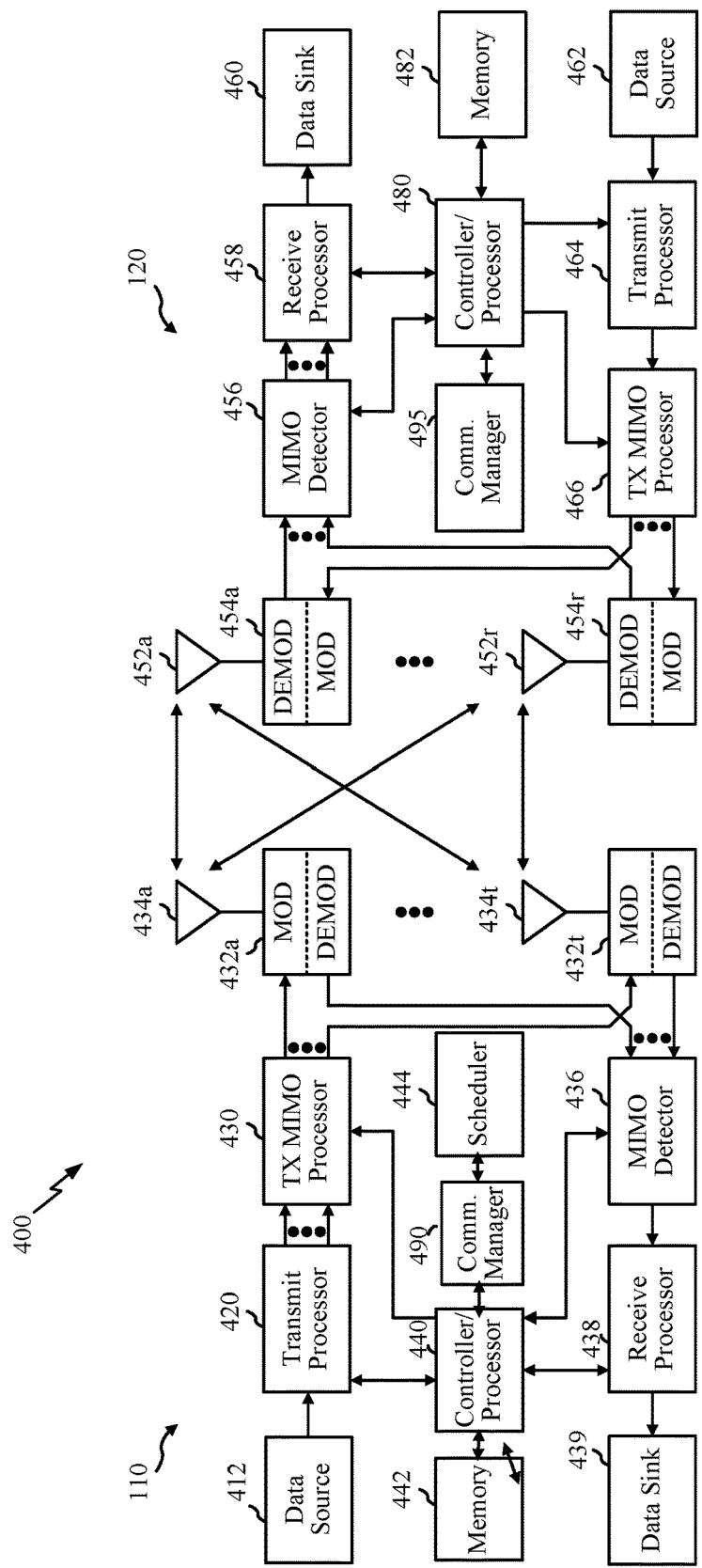
FIG. 4 is a block diagram conceptually illustrating a design of an example Node B and user equipment (UE), according to aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, Tx/Rx 432, processors 430, 420, 438, and/or controller/processor 440 of the BS 110 may be used to perform the operations described herein and illustrated with reference to FIGS. 9-16.

As described above with reference to FIG. 1, the BS and the UE may include a communication manager 490, 495, respectively. The communication manager may be configured to receive or determine interference information regarding communication in a heterogeneous wireless communication system and take action based on the received information. While the communication manager is illustrated as a separate entity in FIG. 4, according to certain aspects, the communication manager may be incorporated in one or more other modules at the BS and UE. As an example, the communication module may be part of the controller/processor and/or the transceiver.

The BS 110 may comprise a TRP. The BS/TRP 110 and UEs 120 may communicate using a narrow GB or lack of a GB in a wireless communication system having heterogeneous numerology.

FIG. 4 shows a block diagram of a design of a base station (Node B, TRP) 110 and a UE 120, which may be one of the base stations (Node Bs, TRPs) and one of the UEs in FIG. 1. For a restricted association scenario, the base station 110 may be the macro Node B 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of various processes for the techniques described herein. The processors and/or modules at the base station 110 may direct the operations of the functional blocks illustrated in FIGS. 10 and 14 and/or other processes for the techniques described herein. The processors and/or modules at the UE 120 may direct the operations of the functional blocks illustrated in FIGS. 11 and 15 and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
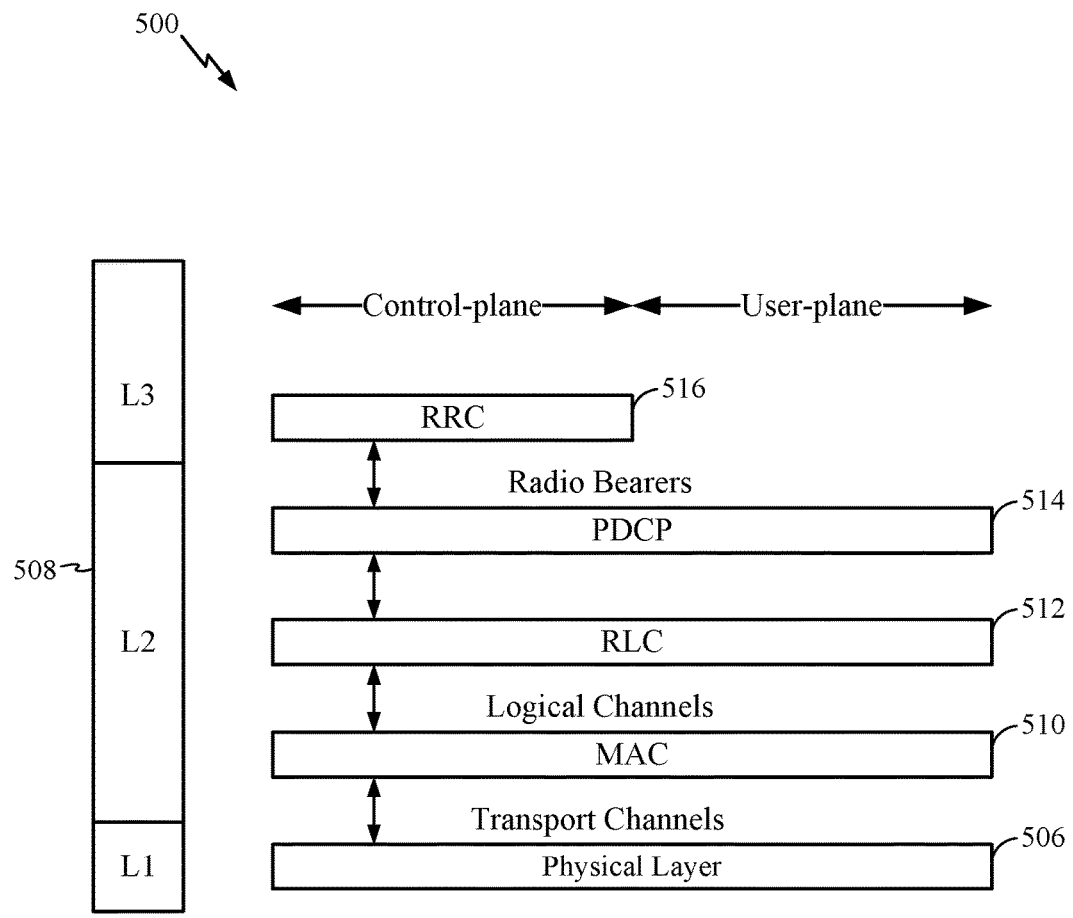
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the Node B is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and Node B over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the Node B on the network side. Although not shown, the UE may have several upper layers above the L2 layer 508 including a network layer (e.g., IP layer) that is terminated at the PDN gateway on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between Node Bs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and Node B is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the Node B and the UE.

Figure 6:
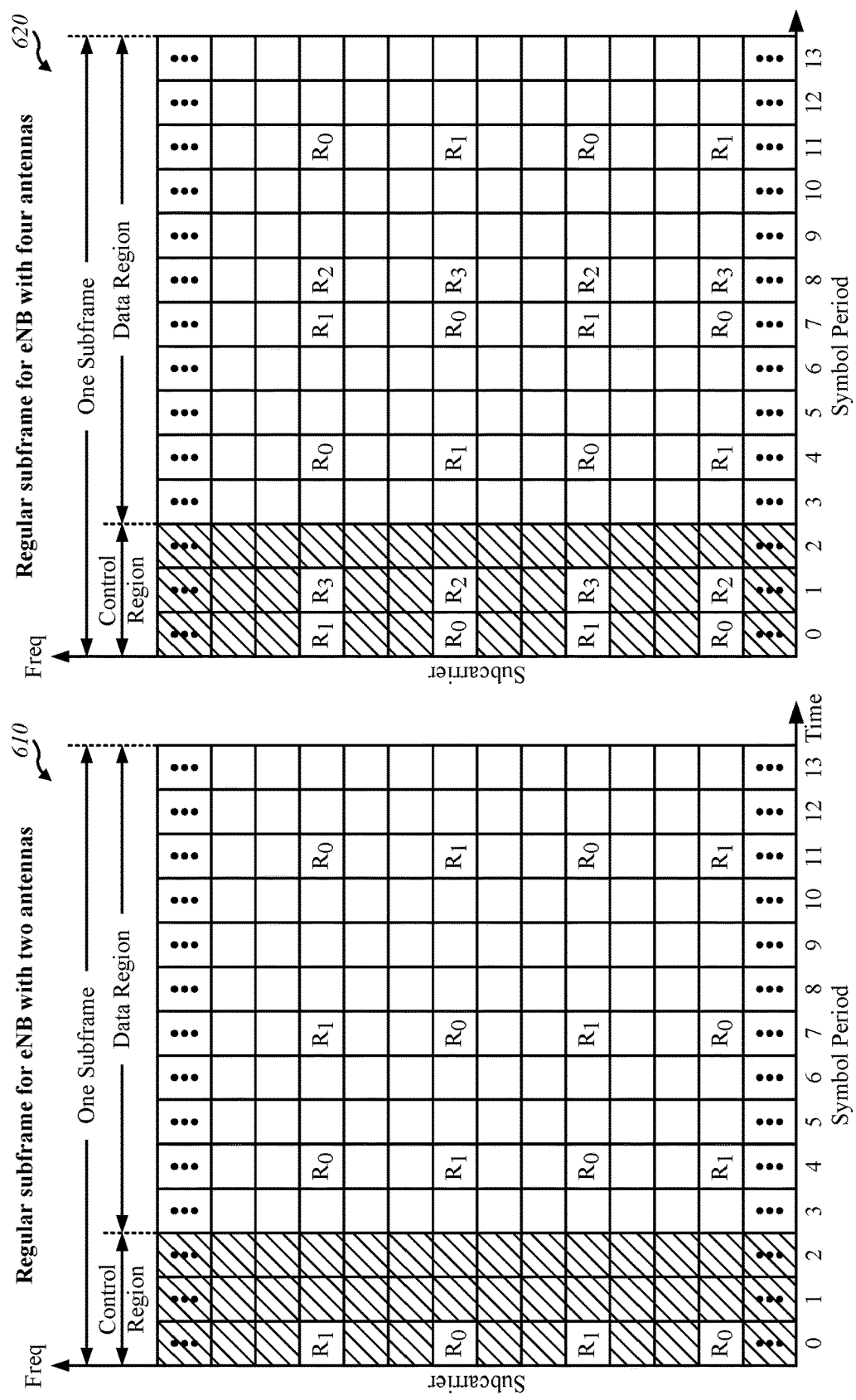
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block (RB) may cover 12 subcarriers in one slot and may include a number of resource elements. Each resource element may cover one subcarrier in one symbol period and may be used to send one modulation symbol, which may be a real or complex value.

Subframe format 610 may be used for a Node B equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a Node B equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different Node Bs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., a Node B) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple Node Bs. One of these Node Bs may be selected to serve the UE. The serving Node B may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering Node Bs.

Example New Radio Cell Measurement

New radio (NR) may refer to radios configured to operate according a wireless standard, such as 5G (e.g., wireless network 100). NR may include Enhanced mobile broadband (eMBB) targeting wide bandwidth (e.g. 80 MHz beyond), millimeter wave (mmWave) targeting high carrier frequency (e.g. 60 GHz), massive MTC (mMTC) targeting non-backward compatible MTC techniques, and mission critical targeting ultra reliable low latency communications (URLLC).

NR cell may refer to a cell operating according in the NR network. A NR Node B (e.g., Node B 110) may correspond to one or multiple transmission reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., network controller 130). The CU may be an Access Node Controller (ANC). The RAN may include a distributed unit that may be one or more TRPs that may be connected to one or more ANCs. TRPs may advertise SI (e.g., Global TRP ID), may include PDCP/RLC/MAC functions, may comprise one or more antenna ports, may be configured to individually (dynamic selection) or jointly (joint transmission), and may serve traffic to the UE.

Example Interference Aware Transceiver Design for Heterogeneous Numerology Systems Heterogeneous numerology wireless communication systems may refer to systems in which UEs may be asynchronous, have different intercarrier spacing and/or have different cyclic prefix lengths. Due to the heterogeneous numerology, an OFDM waveform transmitted by a BS to a first UE may interfere with an OFDM waveform transmitted by the same base station to a second UE. Guard bands (GB or guard intervals) may be used to separate DL transmissions (in the frequency domain) to UEs within a system.

Figure 7:
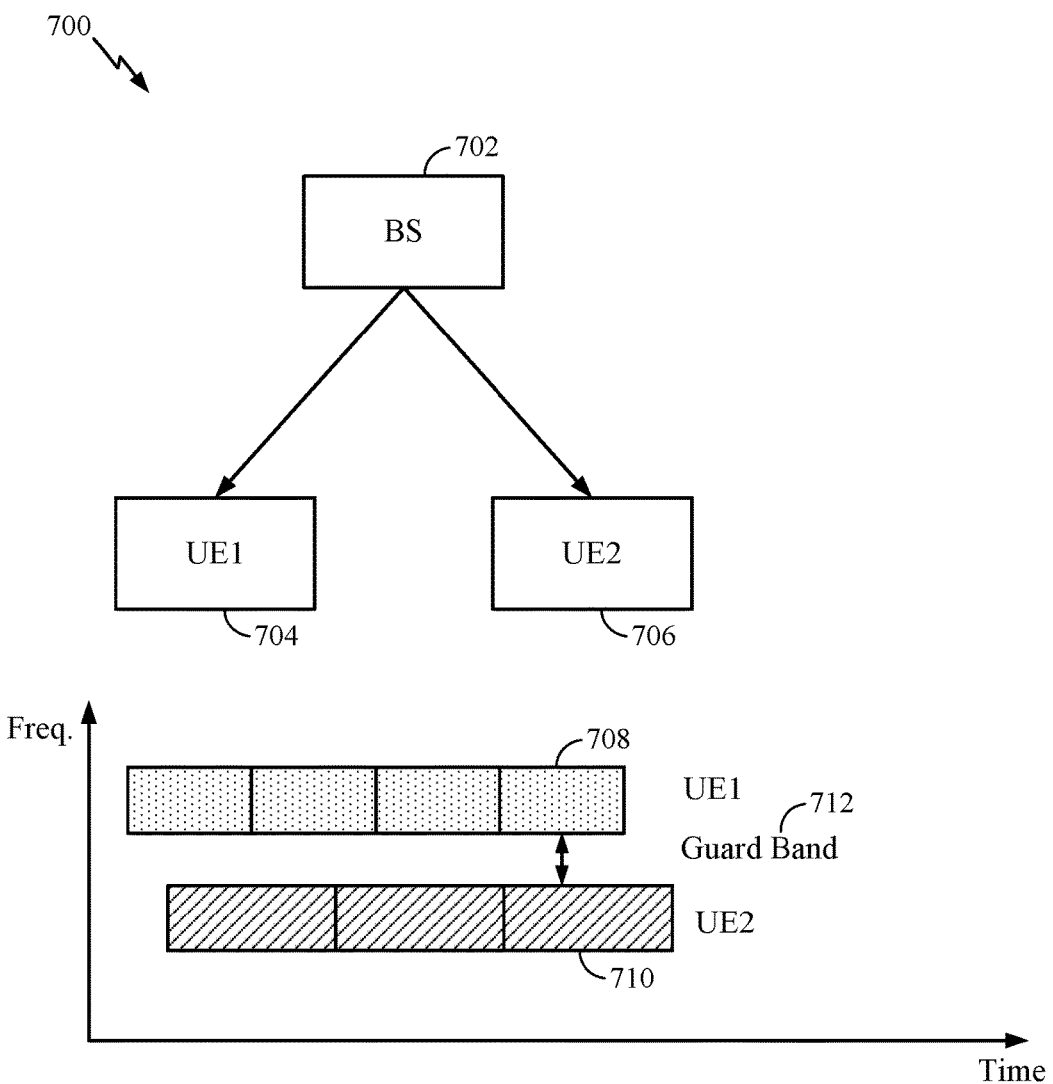
FIG. 7 illustrates an example system with a heterogeneous numerology using GBs, according to aspects of the present disclosure.

FIG. 7 illustrates an example system with a heterogeneous numerology 700 using GBs, according to aspects of the present disclosure. A BS 702 may communicate with a first UE 704 and a second UE 706. Transmission by the BS to the first UE 704 may use the time-frequency resources illustrated at 708. Transmission by the BS to the second UE 706 may use the time-frequency resources illustrated at 710. The GB 712 illustrates a separation, in the frequency domain, of the DL resources used by the BS to communicate with the UEs 704 and 706. The GB 712 may separate transmissions from the BS 702 to the first UE 704 and from the BS 702 to the second UE 706. Absent the GB 712, the DL signals to the first and second UE may interfere with each other.

Figure 8:
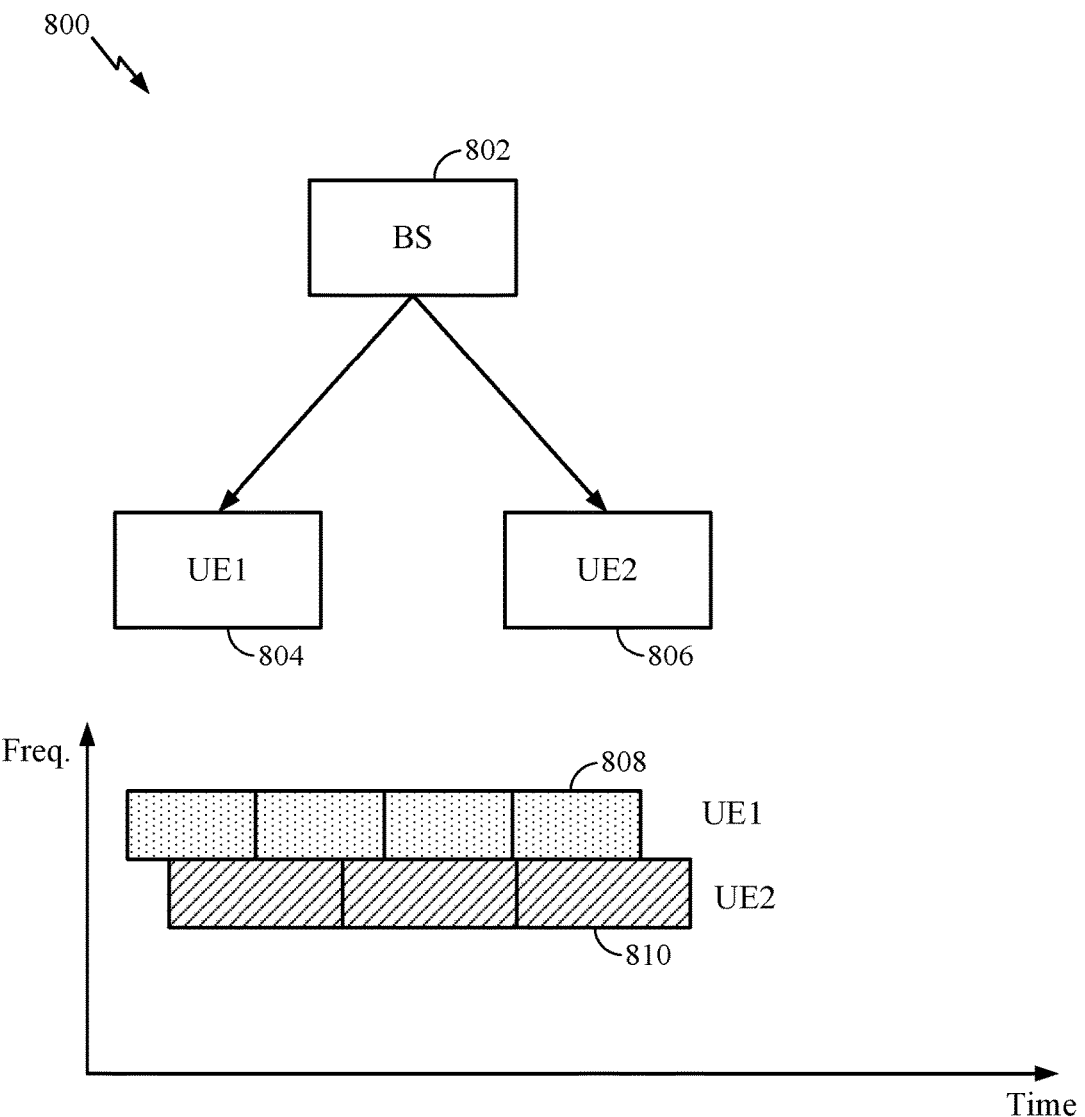
FIG. 8 illustrates an example system with a heterogeneous numerology not using GBs, according to aspects of the present disclosure.

FIG. 8 illustrates an example system with a heterogeneous numerology 800 not using GBs, according to aspects of the present disclosure. A BS 802 may communicate with a first UE 804 and a second UE 806. The time-frequency resources 808 used for DL transmission to the first UE 804 may be adjacent to the time-frequency resources 810 used for DL transmission to the second UE 806. In other words, no GB separating the DL transmissions to the UEs in the frequency domain may be present between resources 808 and 810. While FIG. 8 illustrates a lack of frequency separation (no GB) between 808 and 810, a narrow GB may be present between 808 and 810. For example, the narrow GB may be narrower than GB 712 in FIG. 7, wherein the narrow GB may not separate DL transmissions to the first UE 804 and the second UE 806. Stated otherwise, the narrow GB may be insufficient to separate the DL transmissions. Accordingly, the DL transmissions to UE1 and UE2 may interfere with each other.

Aspects of the present disclosure provide techniques for interference handling in scenarios where no guard band exists between DL transmissions to at least two UEs in a system and/or when only a narrower guard band than is needed to separate DL transmissions to UEs is present between DL transmissions to at least two UEs in a system.

Receiver Scheme

A first UE may receive DL transmissions on a first resource block (RB) and a second UE may receive DL transmissions using a second RB. Each RB may cover 12 subcarriers (tones) in one slot and may include a number of resource elements (REs). Each RE may cover one subcarrier (tone) in one symbol period and may be used to transmit one modulation symbol. The modulation symbol may be a real or complex value.

The first and second RBs may be adjacent to each other in frequency, for example, when no GB is present between the RBs (e.g., as shown in FIG. 8). In certain scenarios, a narrow GB may be present between the first and second RBs. The narrow GB may not be sufficiently large enough to separate the DL transmissions to the first and second UE.

According to aspects, with a narrow GB or lack of a GB between DL transmissions to a first and second UE, a UE may receive explicit signaling indicating information regarding a potentially interfering DL transmission to another UE. The information may be transmitted in a downlink control channel such as a PDCCH. The information may provide one or more indications that may be used by the receiving UE to improve receiver performance.

For illustrative purposes, certain aspects are described with reference to the following scenario. A first UE may be configured to receive DL transmissions from a BS on a first RB. A second UE may be configured to receive DL transmissions from the same BS on a second RB. The first RB and the second RBs may be adjacent to each other in frequency or may be separated by a narrow GB.

According to aspects, information about the potentially interfering DL transmission to the first UE may provide one or more indications to the first UE. For example, the interference information may indicate one or more of (or any combination of) whether or not an interfering transmission is scheduled on an RB adjacent to the first RB, which side (e.g., higher frequency or lower frequency) of the first RB has an adjacent interfering transmission, the tone spacing of the interfering transmission, a duration of the interfering signal for each interfering transmission, and/or the power of the interfering transmission.

The interference information transmitted to the first UE may indicate information regarding interfering transmissions from the BS to the second UE scheduled on the second RB. Similarly, interference information transmitted to the second UE may indicate information regarding interfering transmissions from the BS to the first UE scheduled on the first RB.

According to aspects, the interference information transmitted to the first UE may be transmitted at the beginning of a subframe including the first RB. The information may indicate interference information for at least one of a current, past, or future DL subframe received by the first UE. According to aspects, the interference information may be transmitted in each symbol of the first RB. The symbol may include interference information for one or more of a current, past, or future DL symbol.

A receiver at the UE may use the interference information to enhance decoding and processing for a desired DL transmission, thereby improving receiver performance. According to aspects, the interference information may be used to refine channel estimation and adjust noise level estimation.

Regarding channel estimation, the interference information may be used to determine which tones may be corrupted by an interfering transmission. For example, the first UE may determine which tones in the first RB may be corrupt because of an adjacent, interfering transmission from the BS to the second UE.

Figure 9:
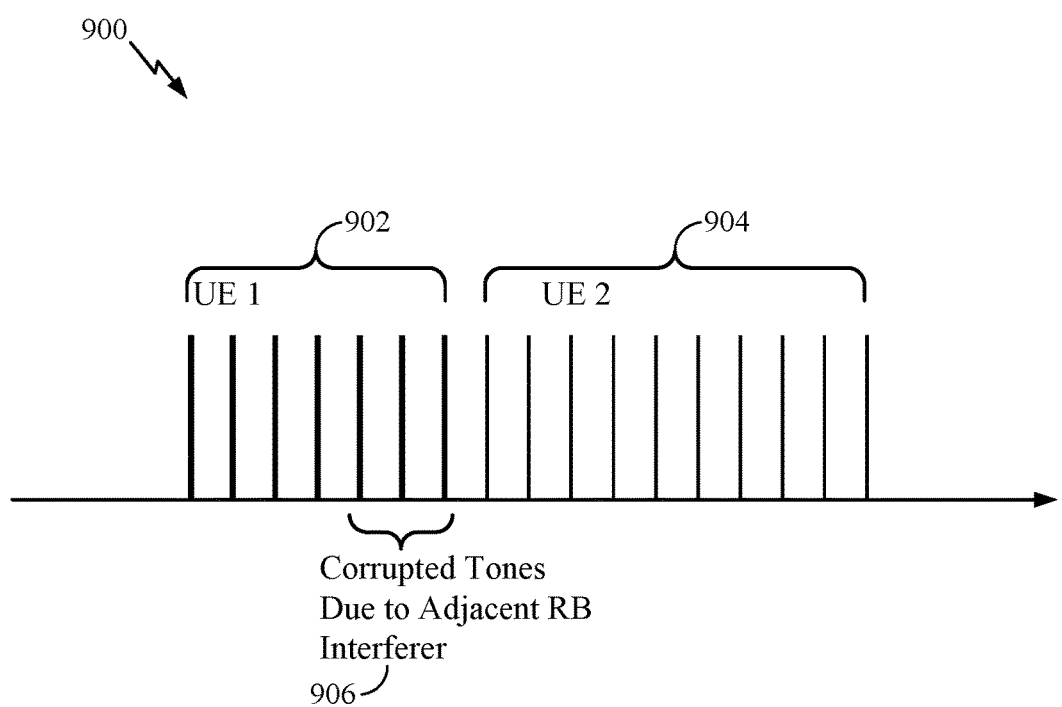
FIG. 9 illustrates an example of corrupt tones, according to aspects of the present disclosure.

FIG. 9 illustrates an example 900 of corrupt tones in a heterogeneous numerology system, according to aspects of the present disclosure. As illustrated, the tones 902 assigned to the first UE may be adjacent to the tones 904 assigned to the second UE. Based, at least in part on the interference information, the first UE may identify corrupt tones 906 within the set of tones 902 assigned to the first UE, due to DL transmissions to the second UE. The first UE may estimate the channel based on the non-corrupt tones (e.g., the set of tones 902 not including the corrupt tones 906). For example, when the first UE determines that certain data modulated reference signal (DMRS) or pilot tones are corrupt, the first UE may estimate the channel by extrapolating the estimation using uncorrupt DMRS or pilot tones. As will be described in more detail below with reference to FIG. 12, according to aspects, the UE may use a lower modulation and coding scheme (MCS) to decode corrupt tones 906 as compared to the MCS used to decode the non-corrupt tones in the group of tones 902.

Regarding channel estimation, the first UE may adjust a noise level for corrupted tones. Because the log likelihood ratio (LLR) may change according channel conditions, adjusting the noise level based, at least in part, on knowledge of corrupt tones may improve the LLR computation at the UE.

According to aspects, instead of receiving explicit signaling regarding the interference information, the UE may blindly detect the interference without receiving an explicit transmission from a BS. According to aspects, the UE may blindly estimate interference parameters from received signals.

Transmitter Scheme

With reference to the example scenario provided above, the BS may be aware of interfering DL transmissions to the first UE on the first RB caused by, for example, DL transmissions to the second UE on the second RB. Based on this information, the BS may identify tones which may be corrupt at the first UE. The BS may use a lower MCS for the identified, corrupt tones. Correspondingly, as noted above, the first UE may use the determined interference information to determine corrupt (e.g., interfered) tones and may use a lower MCS for encoding the corrupt tones.

Figure 10:
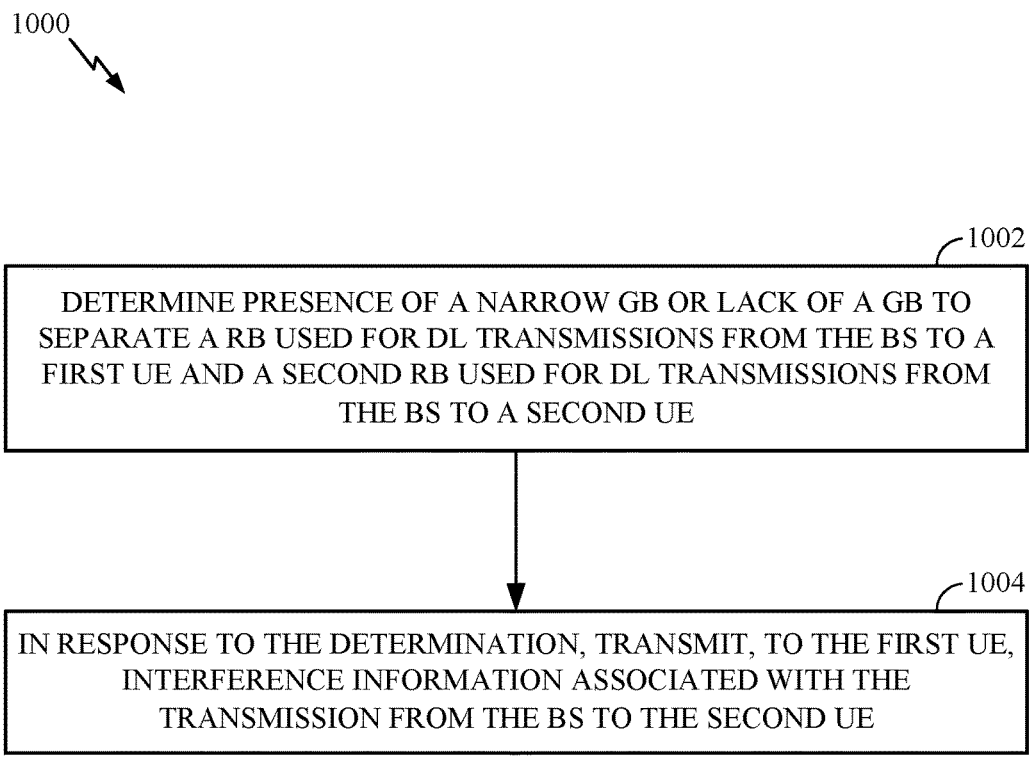
FIG. 10 is a flowchart illustrating example operations for wireless communications by a BS, according to aspects of the present disclosure.

FIG. 10 illustrates example operations 1000 which may be performed by a BS, according to aspects of the present disclosure. The BS may be BS 110a of FIG. 1 and may include one or more components illustrated in FIG. 4. According to aspects, the BS may include one or more components illustrated in FIG. 18, configured to perform the operations described herein.

At 1002, the BS may determine presence of a narrow GB or lack of a GB to separate a first RB used for DL transmission from the BS to a first UE and a second RB used for DL transmission from the BS to a second UE.

In response to the determination, at 1004, the BS may transmit, to the first UE, interference information associated with the transmission from the BS to the second UE.

The interference information transmitted to the first UE may include an indication of one or more of DL interference on an RB adjacent to the first RB, an indication of DL interference on an RB associated with a higher frequency than the first RB, an indication of DL interference on an RB associated with a lower frequency than the first RB, tone spacing of the second UE, a time duration of an interfering DL transmission from the BS to the second UE, or an interference power associated with the DL transmission from the BS to the second UE. The interference information may include one or any combination of the above-described indications.

The interference information may be transmitted using a PDCCH.

The interference information may be transmitted at the beginning of a subframe including the first RB. The interference information may indicate one or more of interference information for the subframe in which the interference information is transmitted, interference information for a subframe occurring after the subframe in which the interference information is transmitted, or interference information for a subframe occurring before the subframe in which the interference information is transmitted. The interference information may include one or any combination of the above-described indications.

According to aspects, the interference information may be transmitted in a symbol of the first RB. The interference information may include one or more of: interference information for the symbol in which the interference information is transmitted, interference information for a symbol occurring after the symbol in which the interference information is transmitted, or interference information for a symbol occurring before the symbol in which the interference information is transmitted. The interference information may include one or any combination of the above-described indications.

The BS may identify at least one tone in the first RB assigned to the first UE and adjacent to the second RB assigned to the second UE. In response, the BS may use a lower modulation and coding scheme (MCS) for encoding the at least one identified tone.

Figure 11:
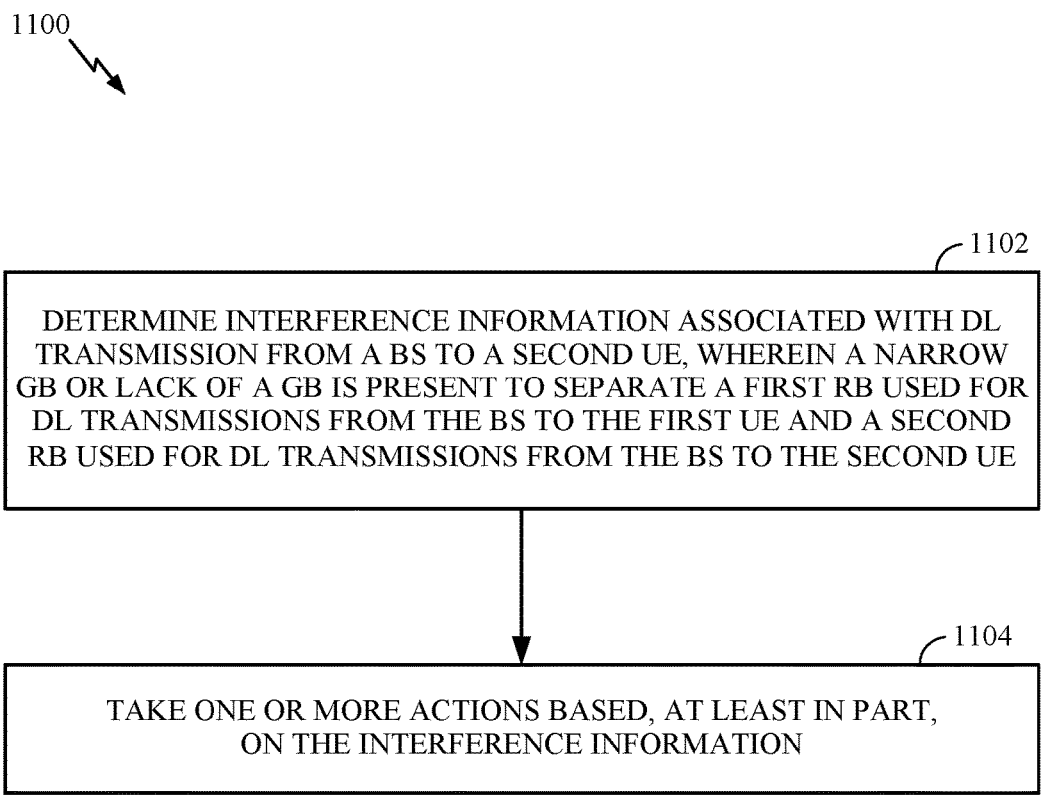
FIG. 11 is a flowchart illustrating example operations for wireless communications by a first UE, according to aspects of the present disclosure.

FIG. 11 illustrates example operations 1100 which may be performed by a first UE, according to aspects of the present disclosure. The first UE may be UE 120a of FIG. 1 and may include one or more components illustrated in FIG. 4. According to aspects, the first UE may be the UE illustrated in FIG. 17, including one or more components configured to perform the operations described herein.

At 1102, the first UE may determine interference information associated with DL transmission from a BS to a second UE, wherein a GB or lack of a GB is present to separate a first RB used for DL transmission from the BS to the first UE and a second RB used for DL transmissions from the BS to the second UE.

At 1104, the first UE may take one or more actions based, at least in part, on the interference information.

The interference information may include one or more of: an indication of DL interference on an RB adjacent to the first RB, an indication of DL interference on an RB associated with a higher frequency than the first RB, an indication of DL interference on an RB associated with a lower frequency than the first RB, tone spacing of the second UE, a time duration of an interfering DL transmission from the BS to the second UE, or an interference power associated with the DL transmission from the BS to the second UE. The interference information may include one or any combination of the above-described indications.

The first UE may receive the interference information via a PDCCH from the BS.

According to aspects, the first UE may receive the interference information at the beginning of a subframe including the first RB. The interference information may include at least one of: interference information for the subframe in which the interference information is transmitted, interference information for a subframe occurring after the subframe in which the interference information is transmitted, or interference information for a subframe occurring before the subframe in which the interference information is transmitted. The interference information may include one or any combination of the above-described indications.

According to aspects the first UE may receive interference information including at least one of: interference information for the symbol in which the interference information is transmitted, interference information for a symbol occurring after the symbol in which the interference information is transmitted, or interference information for a symbol occurring before the symbol in which the interference information is transmitted. The interference information may include one or any combination of the above-described indications.

According to aspects, the UE may determine the interference information by blindly detecting the interference information.

According to aspects, taking the one or more actions may include determining at least one tone in the first RB assigned to the first UE may be corrupt by interference from DL transmission from the BS to the second UE using the second RB. The first UE may use a lower modulation and coding scheme for decoding the at least one corrupt tone. Additionally or alternatively, the first UE may perform channel estimation using non-corrupt tones in the first RB. Additionally or alternatively, the first UE may adjust a noise level for the at least one corrupt tone.

Figure 12:
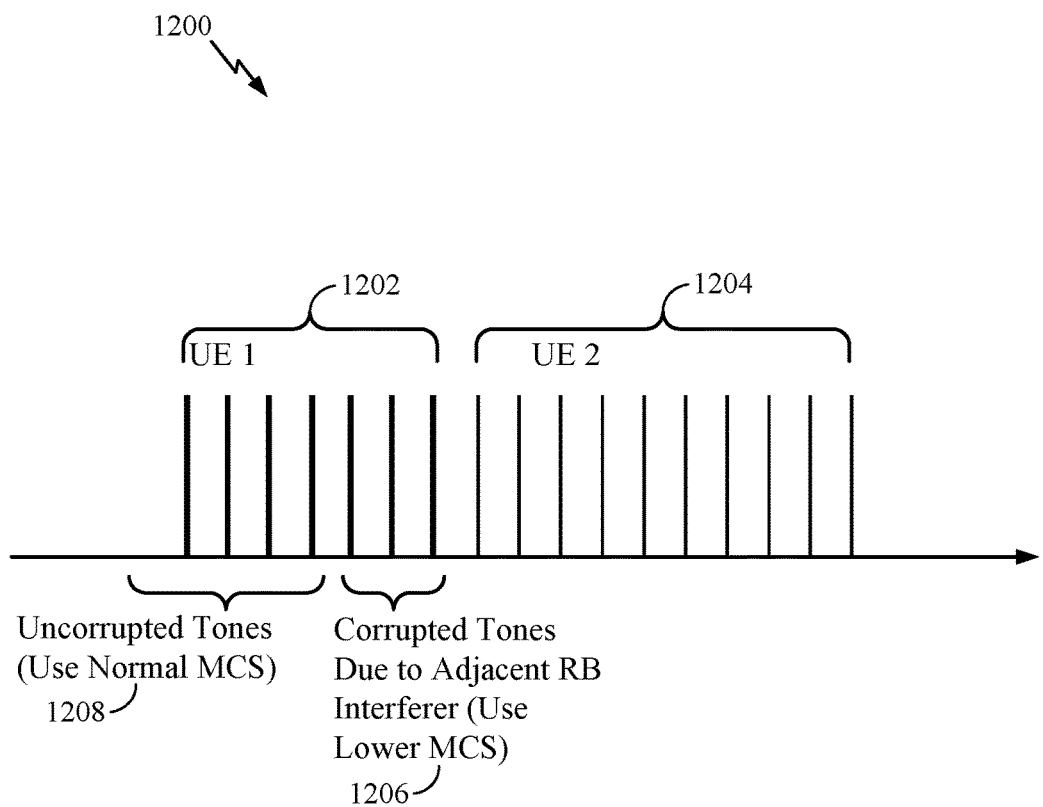
FIG. 12 illustrates an example of handling interference, according to aspects of the present disclosure.

FIG. 12 illustrates an example 1200 of identifying corrupt tones in a heterogeneous numerology system and handling interference, according to aspects of the present disclosure. The tones 1202 assigned to the first UE may be adjacent to the tones 1204 assigned to the second UE. Tones 1206, within the set of tones 1202 may be identified as corrupt tones for the first UE, because they are adjacent to interfering tones used for DL transmissions to the second UE. Tones 1208, within the set of tones 1202, may be identified as non-corrupt.

According to aspects, the BS may transmit, to the first UE, an indication of interference information related to the DL transmission for the second UE (e.g., occurring on tones 1204). Knowing certain tones 1206 are corrupt for the first UE, the BS may use a lower MCS for decoding the corrupt tones 1206 as compared to the non-corrupt tones 1208 for the first UE.

Correspondingly, the first UE may receive the interference information from the BS and determine tones 1206 are corrupt. Alternatively, the UE may blindly detect interference on the corrupt tones 1206. Regardless of how the UE determines which tones are corrupt, the UE may use a lower MCS for decoding the corrupt tones, as compared to the non-corrupt tones 1208. The UE may perform channel estimation using the non-corrupt tones 1208. As the corrupt tones have high interference (or high expected interference), the UE may adjust the noise level for the corrupted tones, which may improve LLR estimation at the UE.

UL/DL Comparison

Figure 13:
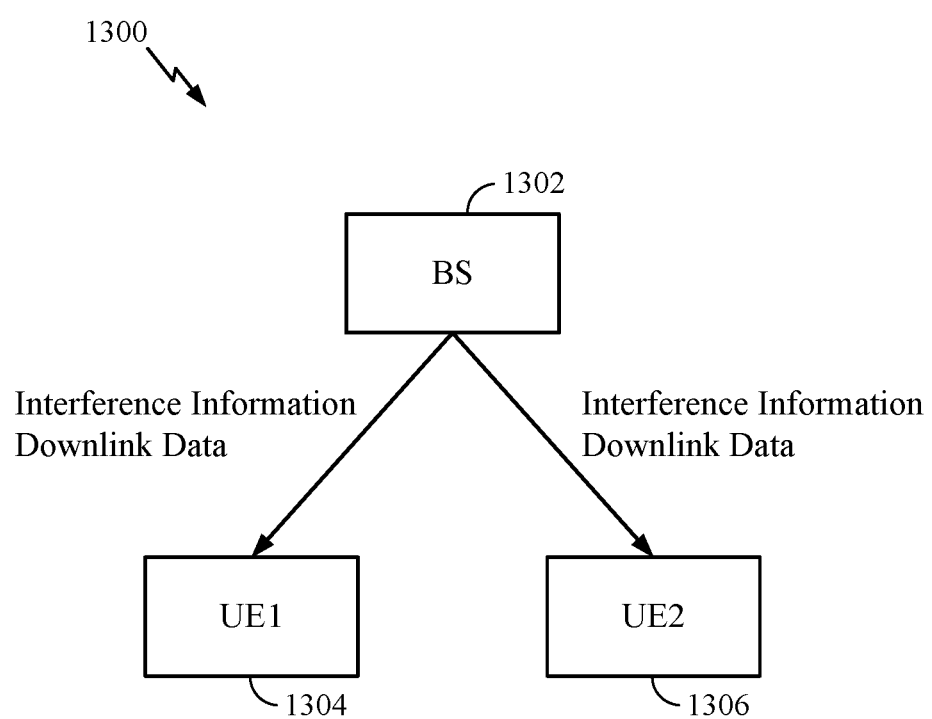
FIG. 13 illustrates an example of DL communication in a heterogeneous wireless communication system, according to aspects of the present disclosure.

FIG. 13 illustrates an example 1300 of DL communication in a heterogeneous wireless communication system, according to aspects of the present disclosure. The BS 1302 may be BS 110a in FIG. 1 and UE 1304 may be UE 120a in FIG. 1 and UE 1306 may be UE 120b in FIG. 1. As described above, the BS 1302 may transmit DL data and interference information to each of the UEs 1304 and 1306 in an effort to facilitate communication in a wireless communication system operating using heterogeneous numerology.

Aspects of the present disclosure may also be applied in an effort to reduce interference caused by UL transmissions from a first and second UE operating in with heterogeneous numerologies.

Figure 14:
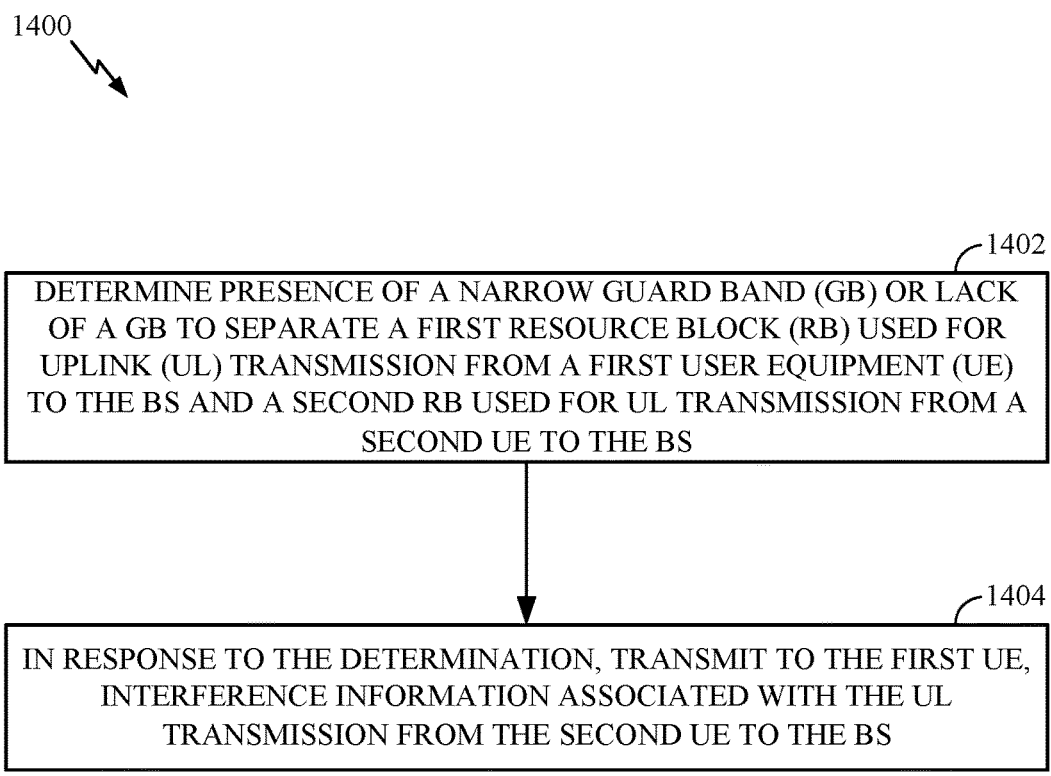
FIG. 14 is a flowchart illustrating example operations for wireless communications by a BS, according to aspects of the present disclosure.

FIG. 14 illustrates example operations 1400 which may be performed by a BS, according to aspects of the present disclosure. The BS may be BS 110a of FIG. 1 and may include one or more components illustrated in FIG. 4. According to aspects, the BS may include one or more components illustrated in FIG. 18, configured to perform the operations described herein.

At 1402, the BS may determine presence of a narrow guard band (GB) or lack of a GB to separate a first resource block (RB) used for uplink (UL) transmission from a first user equipment (UE) to the BS and a second RB used for UL transmission from a second UE to the BS. In response to the determination, at 1404, the BS may transmit to the first UE, interference information associated with the UL transmission from the second UE to the BS.

According to aspects, the interference information transmitted to the first UE may indicate information regarding the uplink interference that may be experienced by the BS due to UL transmissions from the second UE. According to an example, the interference information may include at least one of an indication of UL interference on an RB adjacent to the first RB, an indication of UL interference on an RB associated with a higher frequency than the first RB, an indication of UL interference on an RB associated with a lower frequency than the first RB, tone spacing of the second UE, a time duration of an interfering UL transmission from the second UE to the BS, or an interference power associated with the UL transmission from the second UE to the BS. The interference information may include one or any combination of the above-described indications.

The interference information may be transmitted using a physical downlink control channel (PDCCH).

According to aspects, the BS may transmit the interference information to the first UE in a DL subframe preceding the subframe including the first RB. The interference information may indicate at least one of interference information for an UL subframe occurring after the DL subframe in which the interference information is transmitted, or interference information for a subframe occurring before the subframe in which the interference information is transmitted.

The BS may further identify at least one tone in the first RB assigned to the first UE and adjacent to the second RB assigned to the second UE. In response, the BS may use a lower modulation and coding scheme for decoding the at least one identified tone.

According to aspects, the BS may determine at least one tone in the first RB assigned to the first UE may be corrupt by interference from UL transmission from the second UE to the BS on the second RB. In response, the BS may perform channel estimation using non-corrupt tones in the first RB. The BS adjust a noise level for the at least one corrupt tone.

Figure 15:
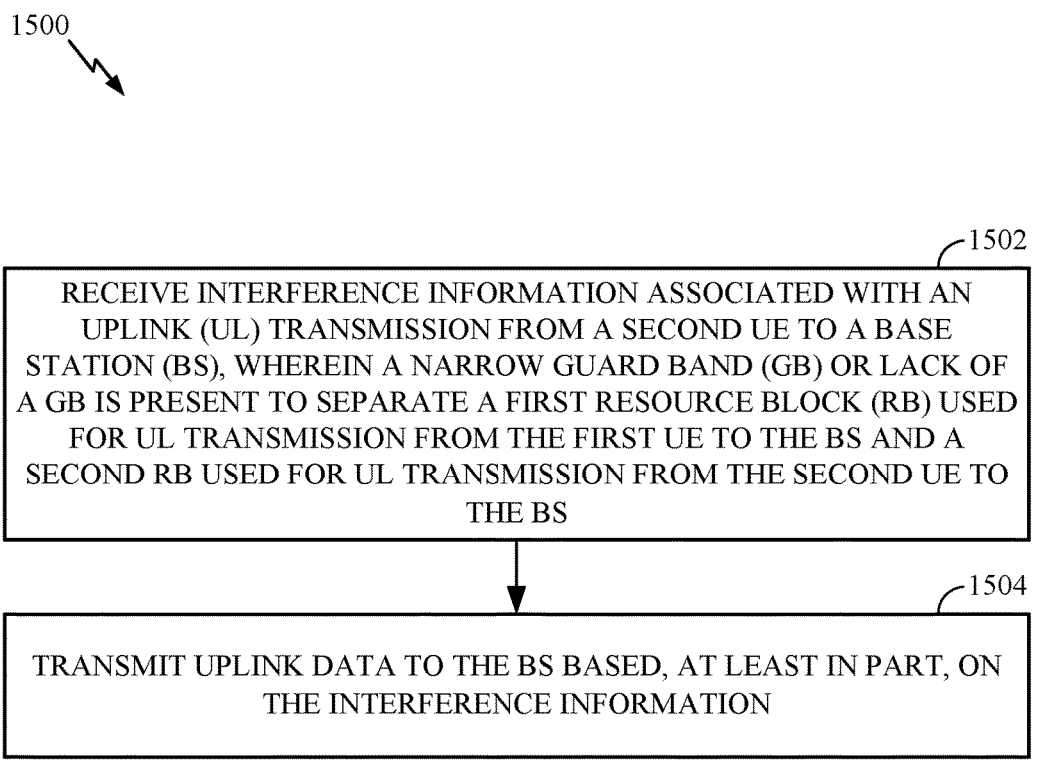
FIG. 15 is a flowchart illustrating example operations for wireless communications by a first UE, according to aspects of the present disclosure.

FIG. 15 illustrates example operations 1500 which may be performed by a first UE, according to aspects of the present disclosure. The UE may be UE 120 of FIG. 1 and may include one or more components illustrated in FIG. 4. According to aspects, the first UE may be the UE illustrated in FIG. 17, including one or more components configured to perform the operations described herein.

At 1502, the UE may receive interference information associated with an uplink (UL) transmission from a second UE to a base station (BS), wherein a narrow guard band (GB) or lack of a GB is present to separate a first resource block (RB) used for UL transmission from the first UE to the BS and a second RB used for UL transmission from the second UE to the BS. At 1504, the UE may transmit uplink data to the BS based, at least in part, on the interference information.

Similar to the DL scenario described above, the interference information may indicate corresponding UL interference. For example, the interference information may provide an indication of UL interference on an RB adjacent to the first RB, an indication of UL interference on an RB associated with a higher frequency than the first RB, an indication of UL interference on an RB associated with a lower frequency than the first RB, tone spacing of the second UE, a time duration of an interfering UL transmission from the second UE to the BS, or an interference power associated with the UL transmission from the second UE to the BS.

The UE may receive the interference information via a physical downlink control channel (PDCCH).

According to aspects, the UE may receive the interference information at the beginning of a subframe including the first RB. The interference information may indicate at least one of: interference information for the subframe in which the interference information is transmitted, interference information for a subframe occurring after the subframe in which the interference information is transmitted, or interference information for a subframe occurring before the subframe in which the interference information is transmitted.

The UE may identify at least one tone in the first RB assigned to the first UE and adjacent to the second RB assigned to the second UE. In response to the identification, the UE may use a lower modulation and coding scheme for encoding the at least one identified tone.

Figure 16:
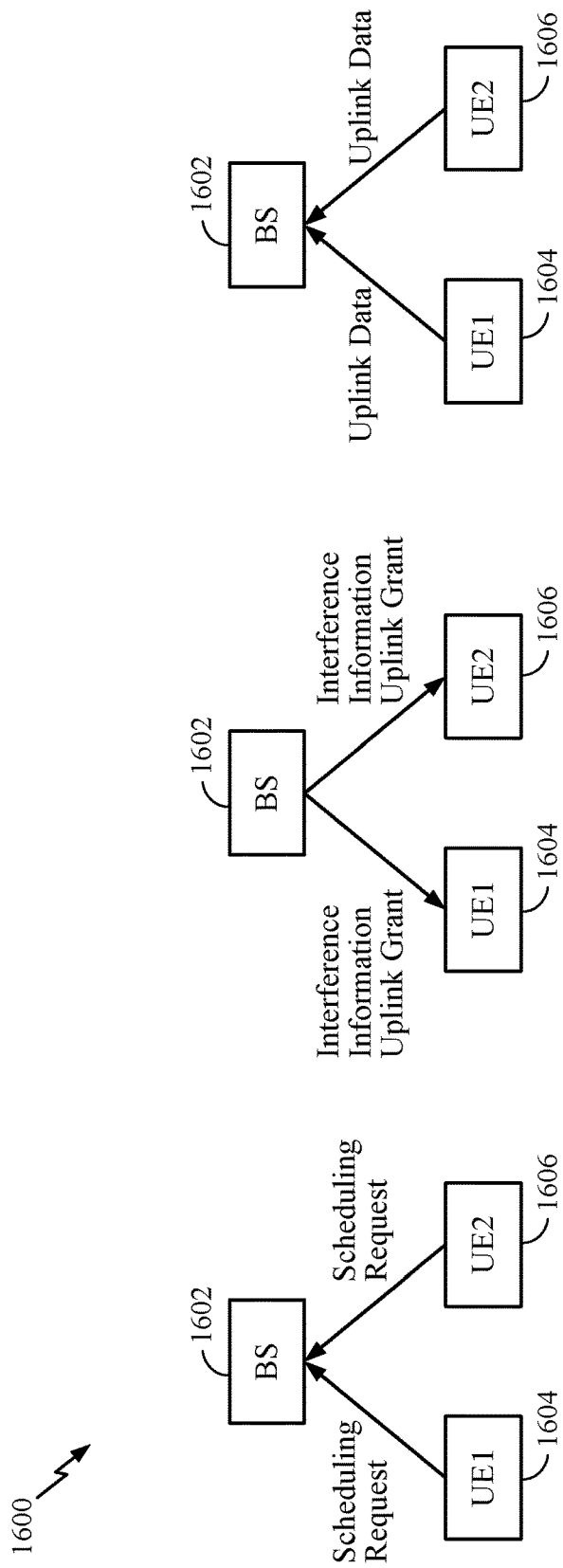
FIG. 16 illustrates an example of UL communication in a heterogeneous wireless communication system, according to aspects of the present disclosure.

FIG. 16 illustrates an example 1600 of UL communication in a heterogeneous wireless communication system, according to aspects of the present disclosure. The UEs 1604 and 1606 may be UEs 120*a* and 120*b*, respectively, illustrated in FIG. 1. The BS 1602 may be BS 110*a* in FIG. 1. The UE may be UE 1702 in FIG. 17 and the BS may be BS 1802 in FIG. 18.

First, each of the UEs 1604 and 1606 may transmit a scheduling request to the BS 1602. The BS 1602 may transmit an uplink grant and interference information to each of the UEs 1604 and 1606. The UEs 1604 and 1606 may transmit UL transmissions to the BS 1602 in accordance with the received UL grant and interference information. For example, after receiving the interference information, the UEs 1604 and 1606 may transmit UL information to the BS in a later subframe according to the received interference information.

According to an example, the interference information transmitted to the first UE may include one or more of an indication of UL interference on an RB adjacent to the first RB, an indication of UL interference on an RB associated with a higher frequency than the first RB, an indication of UL interference on an RB associated with a lower frequency than the first RB, tone spacing of the second UE, a time duration of an interfering UL transmission from the second UE to the BS, or an interference power associated with the UL transmission from the second UE to the BS. The interference may be transmitted in a DL subframe preceding an UL subframe including the first RB.

The BS 1602 may take one or more actions to process signals received from the first and/or second UE. For example, the BS may determine at least one tone in the first RB assigned to the first UE may be corrupt by interference from UL transmission from the second UE to the BS on the second RB. The BS may use a lower modulation and coding scheme for decoding the at least one corrupt tone in the first RB.

The UE may use the received interference information to determine one or more UL tones in the first RB which may be corrupt. The corrupt tones may be adjacent to tones in the second RB assigned to the second UE. In response, the UE may use a lower modulation and coding scheme for encoding these corrupt tones.

According to aspects, the BS may perform channel estimation using non-corrupt tones. According to aspects, the BS may adjust a noise level for at least one corrupt tone.

Aspects described herein may advantageously be used for transceiver designs in a heterogeneous numerology system, in an effort to handle interference at both a transmitting and receiving device.

Figure 17:
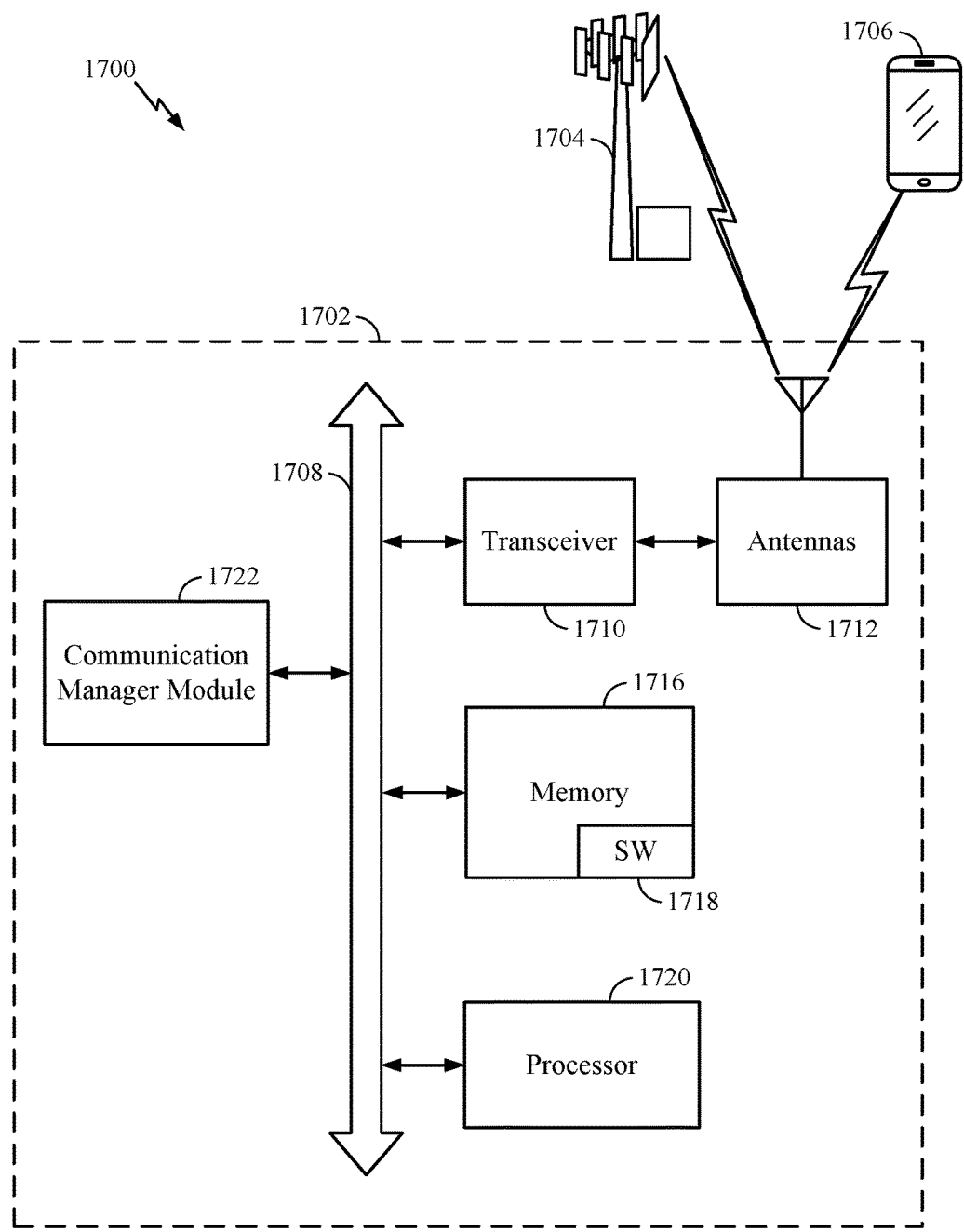
FIG. 17 illustrates a block diagram of a system including a UE configured to handle interference in a heterogeneous numerology environment, according to aspects of the present disclosure.

FIG. 17 illustrates an example system 1700 of a UE configured to handle and mitigate interference in a heterogeneous numerology environment, as described herein. System 1700 may include UE 1702, which may be an example of a UE described above with reference to FIGS. 1 and 4 which may be configured to perform the operations described herein as illustrated in FIGS. 11 and 15.

UE 1702 may include a communication manager module 1722, which may be configured to determine, receive, and/or process interference information and take action for communicating in a heterogeneous numerology wireless communication environment as described herein. The UE 1702 may also include components for bi-directional voice and data communications including components for transmitting communications and components for receiving communications. For example, UE 1702 may communicate bi-directionally with UE 1706 or base station 1704.

UE 1702 may also include a processor module 1720, and memory 1716 (including software (SW) 1718), a transceiver module 1710, and one or more antenna(s) 1712, each of which may communicate, directly or indirectly, with one another (e.g., via buses 1708). The transceiver module 1710 may communicate bi-directionally, via the antenna(s) 1712 or wired or wireless links, with one or more networks, as described above. For example, the transceiver module 1710 may communicate bi-directionally with a base station 1704 or another UE 1706. The transceiver module 1710 may include a modem to modulate the packets and provide the modulated packets to the antenna(s) 1712 for transmission, and to demodulate packets received from the antenna(s) 1712. While the UE 1702 may include a single antenna 1712, the UE 1702 may also have multiple antennas 1712 capable of concurrently transmitting or receiving multiple wireless transmissions.

The memory 1716 may include random access memory (RAM) and read only memory (ROM). The memory 1716 may store computer-readable, computer-executable software/firmware code including instructions that, when executed, cause the processor module 1720 to perform various functions described herein (e.g., handling interference in a heterogeneous numerology environment). Alternatively, the software/firmware code may not be directly executable by the processor module 1720 but cause a computer (e.g., when compiled and executed) to perform functions described herein. The processor module 1720 may include an intelligent hardware device (e.g., a central processing unit (CPU), a microcontroller, an ASIC, etc.).

Figure 18:
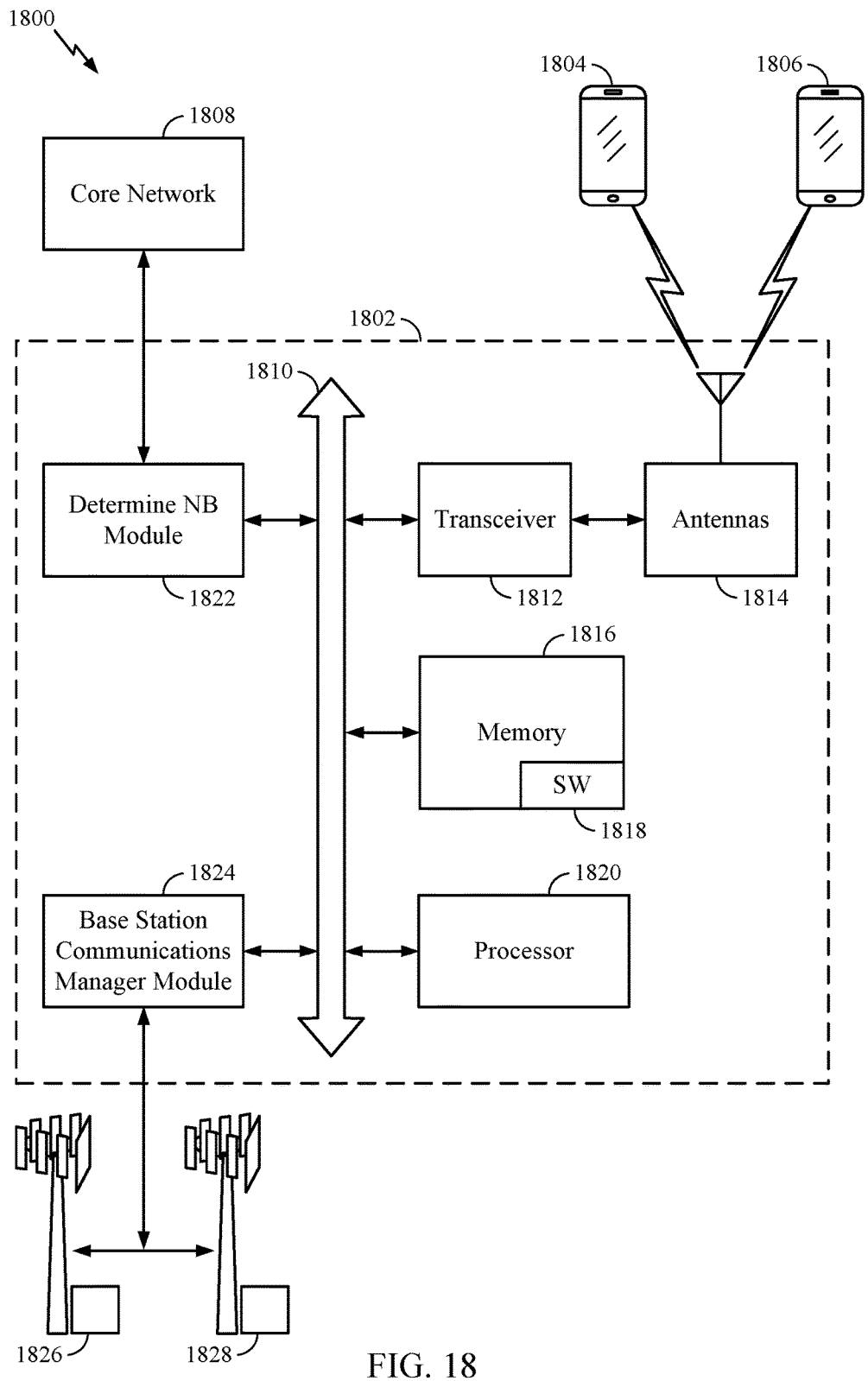
FIG. 18 illustrates a block diagram of a system including a BS configured to handle interference in a heterogeneous numerology environment, according to aspects of the present disclosure.

FIG. 18 illustrates an example of a system 1800 including a base station configured for handling and mitigating interference in a heterogeneous numerology wireless communication environment in accordance with various aspects of the present disclosure. System 1800 may include base station 1802, which may be an example of a base station described above with reference to FIGS. 1 and 4 which may be configured to perform the operations described herein as illustrated in FIGS. 10 and 14.

Base station 1802 may include a determination of narrow band or lack of a guard band module 1822. Base station 1802 may also include components for bi-directional voice and data communications including components for transmitting communications and components for receiving communications. For example, base station 1802 may communicate bi-directionally with UE 1804 or UE 1806.

In some cases, base station 1802 may have one or more wired backhaul links. Base station 1802 may have a wired backhaul link (e.g., S1 interface, etc.) to the core network 1808. Base station 1802 may also communicate with other base stations, such as base station 1826 and base station 1828 via inter-base station backhaul links (e.g., an X2 interface). Each of the base stations may communicate with UEs 1804 and 1806 using the same or different wireless communications technologies. In some cases, base station 1802 may communicate with other base stations such as 1826 or 1828 utilizing base station communications module 1824. In some embodiments, base station communications module 1824 may provide an X2 interface within an LTE/LTE-A wireless communication network technology to provide communication between some of the base stations. In some embodiments, base station 1802 may communicate with other base stations through core network 1808. In some cases, base station 1802 may communicate with the core network 1808 through network communications module 1824.

The BS 1802 may include a communication manager module 1824, which may be configured to determine and/or process interference information and take action as described herein for communicating in a heterogeneous numerology wireless communication environment.

The base station 1802 may include a processor module 1820, memory 1816 (including software (SW) 1818), transceiver modules 1812, and antenna(s) 1814, which each may be in communication, directly or indirectly, with one another (e.g., over bus system 1810). The transceiver modules 1812 may be configured to communicate bi-directionally, via the antenna(s) 1814, with the UEs 1804, 1806, which may be multi-mode devices. The transceiver module 1812 (or other components of base station) may also be configured to communicate bi-directionally, via the antennas 1814, with one or more other base stations (not shown). The transceiver module 1812 may include a modem configured to modulate the packets and provide the modulated packets to the antennas for transmission, and to demodulate packets received from the antennas 1814. The base station may include multiple transceiver modules 1812, each with one or more associated antennas 1814. The transceiver module may be an example of a combined receiver and transmitter.

The memory 1816 may include RAM and ROM. The memory 1816 may also store computer-readable, computer-executable software code 1818 containing instructions that are configured to, when executed, cause the processor module 1820 to perform various functions described herein (e.g., handling interference in a heterogeneous numerology environment). Alternatively, the software code 1818 may not be directly executable by the processor module 1820 but be configured to cause the computer (e.g., when compiled and executed), to perform functions described herein. The processor module 1820 may include an intelligent hardware device, (e.g., a CPU, a microcontroller, an ASIC, etc.). The processor module 1820 may include various special purpose processors such as encoders, queue processing modules, base band processors, radio head controllers, digital signal processor (DSPs), and the like. The base station communications module 1824 may manage communications with other base stations 1826, 1828.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product and/or a computer readable medium.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product/computer readable medium for performing the operations presented herein. For example, such a computer program product may comprise a computer readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a base station (BS), comprising:
   determining presence of a narrow guard band (GB) or lack of a GB to separate a first resource block (RB) used for downlink (DL) transmission from the BS to a first user equipment (UE) using a first numerology and a second RB used for DL transmission from the BS to a second UE using a second numerology; and
   in response to the determination, transmitting, to the first UE, interference information associated with the transmission from the BS to the second UE comprising an indication of DL interference on an RB associated with a higher frequency than the first RB.

2. The method of claim 1, wherein the interference information transmitted to the first UE further comprises at least one of:
   an indication of DL interference on an RB adjacent to the first RB, an indication of DL interference on an RB associated with a lower frequency than the first RB, tone spacing of the second UE, or a time duration of an interfering DL transmission from the BS to the second UE, or an interference power associated with the DL transmission from the BS to the second UE.

3. The method of claim 1, wherein the interference information is transmitted using a physical downlink control channel (PDCCH).

4. The method of claim 1, wherein transmitting, to the first UE, the interference information associated with the transmission from the BS to the second UE comprises:
   transmitting the interference information at the beginning of a subframe including the first RB,
   wherein the interference information indicates at least one of: interference information for the subframe in which the interference information is transmitted, interference information for a subframe occurring after the subframe in which the interference information is transmitted, or interference information for a subframe occurring before the subframe in which the interference information is transmitted.

5. The method of claim 1, wherein transmitting, to the first UE, the interference information associated with the transmission from the BS to the second UE further comprises:
   transmitting the interference information in a symbol of the first RB,
   wherein the interference information includes at least one of: interference information for the symbol in which the interference information is transmitted, interference information for a symbol occurring after the symbol in which the interference information is transmitted, or interference information for a symbol occurring before the symbol in which the interference information is transmitted.

6. The method of claim 1, further comprising:
   identifying at least one tone in the first RB assigned to the first UE and adjacent to the second RB assigned to the second UE; and
   using a lower modulation and coding scheme for encoding the at least one identified tone.

7. A method for wireless communication by a first user equipment (UE), comprising:
   determining interference information associated with downlink (DL) transmission from a base station (BS) to a second UE, wherein a narrow guard band (GB) or lack of a GB is present to separate a first resource block (RB) used for DL transmission from the BS to the first UE using a first numerology and a second RB used for DL transmission from the BS to the second UE using a second numerology, the interference information indicating DL interference on an RB associated with a higher frequency than the first RB; and
   taking one or more actions based, at least in part, on the interference information.

8. The method of claim 7, wherein the interference information further comprises at least one of:
   an indication of DL interference on an RB adjacent to the first RB, an indication of DL interference on an RB associated with a lower frequency than the first RB, tone spacing of the second UE, or a time duration of an interfering DL transmission from the BS to the second UE, or an interference power associated with the DL transmission from the BS to the second UE.

9. The method of claim 7, further comprising:
   receiving the interference information via a physical downlink control channel (PDCCH).

10. The method of claim 9, wherein receiving the interference information associated with the transmission from the BS to the second UE comprises:
    receiving the interference information at the beginning of a subframe including the first RB,
    wherein the interference information indicates at least one of: interference information for the subframe in which the interference information is transmitted, interference information for a subframe occurring after the subframe in which the interference information is transmitted, or interference information for a subframe occurring before the subframe in which the interference information is transmitted.

11. The method of claim 9, wherein receiving the interference information associated with the transmission from the BS to the second UE further comprises:
    receiving the interference information in a symbol of the first RB,
    wherein the interference information includes at least one of: interference information for the symbol in which the interference information is transmitted, interference information for a symbol occurring after the symbol in which the interference information is transmitted, or interference information for a symbol occurring before the symbol in which the interference information is transmitted.

12. The method of claim 7, wherein taking the one or more actions comprises:
    determining at least one tone in the first RB assigned to the first UE is corrupted or potentially corrupted by interference from DL transmission from the BS to the second UE using the second RB.

13. The method of claim 12, wherein taking the one or more actions comprises:
using a lower modulation and coding scheme for decoding the at least one corrupt tone.

14. The method of claim 12, wherein taking the one or more actions comprises:
performing channel estimation using non-corrupt tones in the first RB.

15. The method of claim 12, wherein taking the one or more actions comprises:
adjusting a noise level for the at least one corrupt tone.

16. The method of claim 7, wherein determining the interference information comprises blindly detecting the interference information.

17. A method for wireless communication by a base station (BS), comprising:
determining presence of a narrow guard band (GB) or lack of a GB to separate a first resource block (RB) used for uplink (UL) transmission from a first user equipment (UE) to the BS using a first numerology and a second RB used for UL transmission from a second UE to the BS using a second numerology; and
in response to the determination, transmitting to the first UE, interference information associated with the UL transmission from the second UE to the BS comprising an indication of UL interference on an RB associated with a higher frequency than the first RB.

18. The method of claim 17, wherein the interference information transmitted to the first UE further comprises at least one of:
an indication of UL interference on an RB adjacent to the first RB, an indication of UL interference on an RB associated with a lower frequency than the first RB, tone spacing of the second UE, or a time duration of an interfering UL transmission from the second UE to the BS, or an interference power associated with the UL transmission from the second UE to the BS.

19. The method of claim 17, wherein the interference information is transmitted using a physical downlink control channel (PDCCH).

20. The method of claim 17, wherein transmitting, to the first UE, the interference information associated with the transmission from the first UE to the BS comprises:
transmitting the interference information in a DL subframe preceding the subframe including the first RB,
wherein the interference information indicates at least one of, interference information for an UL subframe occurring after the DL subframe in which the interference information is transmitted, or interference information for a subframe occurring before the subframe in which the interference information is transmitted.

21. The method of claim 17, further comprising:
identifying at least one tone in the first RB assigned to the first UE and adjacent to the second RB assigned to the second UE; and
using a lower modulation and coding scheme for decoding the at least one identified tone.

22. A method for wireless communication by a first user equipment (UE), comprising:
receiving interference information associated with an uplink (UL) transmission from a second UE to a base station (BS), wherein a narrow guard band (GB) or lack of a GB is present to separate a first resource block (RB) used for UL transmission from the first UE to the BS using a first numerology and a second RB used for UL transmission from the second UE to the BS using a second numerology, the interference information indicating UL interference on an RB associated with a higher frequency than the first RB; and
transmitting uplink data to the BS based, at least in part, on the interference information.

23. The method of claim 22, wherein the interference information comprises at least one of:
an indication of UL interference on an RB adjacent to the first RB, an indication of UL interference on an RB associated with a lower frequency than the first RB, tone spacing of the second UE, or a time duration of an interfering UL transmission from the second UE to the BS, or an interference power associated with the UL transmission from the second UE to the BS.

24. The method of claim 22, further comprising:
receiving the interference information via a physical downlink control channel (PDCCH).

25. The method of claim 22, wherein receiving the interference information associated with the transmission from the second UE to the BS comprises:
receiving the interference information at the beginning of a subframe including the first RB,
wherein the interference information indicates at least one of: interference information for the subframe in which the interference information is transmitted, interference information for a subframe occurring after the subframe in which the interference information is transmitted, or interference information for a subframe occurring before the subframe in which the interference information is transmitted.

26. The method of claim 22, further comprising:
identifying at least one tone in the first RB assigned to the first UE and adjacent to the second RB assigned to the second UE; and
using a lower modulation and coding scheme for encoding the at least one identified tone.

* * * * *